(12) United States Patent
Tetsuka et al.

(10) Patent No.: US 7,704,172 B2
(45) Date of Patent: Apr. 27, 2010

(54) BICYCLE FRONT DERAILLEUR

(75) Inventors: Toshio Tetsuka, Osaka (JP); Yoshiaki Nanko, Osaka (JP)

(73) Assignee: Shimano Inc., Osaka (JP)

(*) Notice: Subject to any disclaimer, the term of this patent is extended or adjusted under 35 U.S.C. 154(b) by 1442 days.

(21) Appl. No.: 10/989,114

(22) Filed: Nov. 16, 2004

(65) Prior Publication Data

US 2005/0143206 A1 Jun. 30, 2005

(30) Foreign Application Priority Data

Dec. 25, 2003 (JP) ............................. 2003-430237

(51) Int. Cl.
*F16H 9/00* (2006.01)
*F16B 7/06* (2006.01)
(52) U.S. Cl. ............................. 474/80; 474/82; 403/59; 403/61
(58) Field of Classification Search ................... 474/80, 474/82; 403/59, 61
See application file for complete search history.

(56) References Cited

U.S. PATENT DOCUMENTS

| | | | | | |
|---|---|---|---|---|---|
| 628,743 | A | * | 7/1899 | Biggs | ........................... 403/59 |
| 2,697,975 | A | * | 12/1954 | Buhr | ........................... 403/61 |
| 4,199,997 | A | | 4/1980 | Isobe | |
| 4,199,998 | A | * | 4/1980 | Isobe | ........................... 474/82 |
| 5,846,148 | A | * | 12/1998 | Fujii | ........................... 474/80 |

FOREIGN PATENT DOCUMENTS

| BE | 885 324 | | 1/1981 |
|---|---|---|---|
| DE | 31 18 035 | A1 | 2/1982 |
| DE | 33 10 170 | A1 | 10/1984 |
| JP | 53-102550 | | 9/1978 |

* cited by examiner

*Primary Examiner*—Bradley T King
*Assistant Examiner*—Mahbubur Rashid
(74) *Attorney, Agent, or Firm*—Global IP Counselors, LLP

(57) ABSTRACT

A front derailleur is configured to be accurately mounted to a bicycle frame in a prescribed mounting position. The front derailleur has a chain guide, a front derailleur main body, an intermediate piece and a fastening piece. The front derailleur main body has a mounting part with a curved mounting face having a circular arc arranged around a first pivot axis extending in a first direction. The intermediate piece has a first curved abutting face mating with the curved mounting face of the mounting part to pivot relative to each other about the first pivot axis, a second curved abutting face having a circular arc arranged around a second pivot axis extending in a second direction perpendicularly arranged relative to the first direction, and a first through hole extending in a third direction generally perpendicular to the first and second directions and passes through the first and second abutting faces.

11 Claims, 18 Drawing Sheets

BICYCLE FRONT DERAILLEUR

This application claims priority to Japanese Patent Application No. 2003-430237. The entire disclosure of Japanese Patent Application No. 2003-430237 is hereby incorporated herein by reference.

BACKGROUND OF THE INVENTION

1. Field of the Invention

The present invention relates to a front derailleur for bicycle use. More particularly, the present invention relates to a front derailleur configured to be mounted to the frame of a bicycle by a fastening piece.

2. Background Information

There are front derailleurs for bicycles that are mounted to the bicycle frame with a fastening piece that is disposed between the front derailleur and the bicycle frame. The fastening piece used with this kind of front derailleur has a fixing part that is fixed to the frame by welding or the like and a support part configured to support the front derailleur. Since the position to which the fastening piece is installed on the frame depends on the quality of the work performed when fixing the fixing part to the frame, there are times when the installation precision of the fastening piece is poor. When the installation precision of the fastening piece (more specifically, the fixing part) is poor, the position of the support part is offset from where it should be and, consequently, there are cases in which the front derailleur cannot be installed in the prescribed position. For example, if the fastening piece is installed poorly on the seat tube of the bicycle frame, the support part might be out of position relative to the circumferential direction of the seat tube or in the lengthwise direction of the seat tube.

In order to resolve this issue, a front bicycle derailleur has been proposed in U.S. Pat. No. 4,199,997 (Japanese Laid-Open Patent Publication 53-102550), assigned to Shimano Inc., that is mounted to a support part in such a manner that it can be swung about a center axis of the seat tube and moved up and down along the lengthwise direction of the seat tube in order to adjust the mounting position. The front derailleur basically includes a chain guide, a four bar-linkage mechanism, and a front derailleur main body having a fastening piece with a mounting part configured to be mounted to the support part by a fastening screw. The structure of the front derailleur and the fastening piece presented in the publication will now be described in further detail.

The support part has a first curved support face that is curved in such a manner as to have the shape of a circular arc in a cross sectional view of the support part lying in a plane normal to the lengthwise direction of the seat tube and a first through hole that runs through the first curved support face substantially in a second direction perpendicular to the lengthwise direction of the seat tube. The first through hole is elongated in a direction substantially parallel to the lengthwise direction of the seat tube.

The mounting part has a mounting face that is curved in a manner corresponding to the contour of the first curved support face of the support part in a cross sectional view of the support part lying in a plane normal to the lengthwise direction of the seat tube. The mounting part of the front derailleur main body is mounted to the support part with the fastening screw that passes through the first through hole of the support part in such a manner as to extend in a direction substantially parallel to the second direction.

Since the first through hole of the support part of the fastening piece is elongated in a direction substantially parallel to the lengthwise direction of the seat tube, the mounting part of the front derailleur main body can be moved along a path substantially parallel to the lengthwise direction of the seat tube with respect to the support part when the mounting part is being mounted to the support part. Additionally, since the first curved support face is curved in such a manner as to have the shape of a circular arc in a cross sectional view of the support part lying in a plane normal to the lengthwise direction of the seat tube and the mounting face is curved in a manner corresponding to the contour of the first curved support face of the support part in a cross sectional view of the mounting part lying in a plane normal to the lengthwise direction of the seat tube, the front derailleur main body can be swung about the center of curvature of the first curved support face (i.e., its position can be adjusted in a manner that approximates turning about the center axis of the seat tube) when the mounting part is being mounted to the support part.

In view of the above, it will be apparent to those skilled in the art from this disclosure that there exists a need for an improved front derailleur. This invention addresses this need in the art as well as other needs, which will become apparent to those skilled in the art from this disclosure.

SUMMARY OF THE INVENTION

Even though the mounting position of the front derailleur just described can be adjusted in two directions with respect to the fastening piece, there are still cases in which the front derailleur can not be mounted accurately in the prescribed position. Thus, there is a need for the mounting position of the front derailleur to be adjustable with a greater degree of freedom.

The object of the present invention is to improve a front derailleur configured to be mounted to the frame of a bicycle by a fastening piece in such a manner that the front derailleur can be adjusted accurately to the prescribed mounting position even when the fastening piece has been installed imprecisely to the frame of the bicycle.

In accordance with one aspect of the invention, a bicycle front derailleur is provided that comprises a chain guide, a front derailleur main body and at least one first intermediate piece. The chain guide is configured to engage a bicycle chain. The front derailleur main body is operatively coupled to the chain guide. The front derailleur main body includes a mounting part with a curved mounting face having a circular arc arranged around a first pivot axis extending in a first direction. The first intermediate piece includes a first curved abutting face, a second curved abutting face and a first through hole. The first curved abutting face mates with the curved mounting face of the mounting part to pivot relative to each other about the first pivot axis. The second curved abutting face has a circular arc arranged around a second pivot axis extending in a second direction perpendicularly arranged relative to the first direction. The first through hole extends in a third direction generally perpendicular to the first and second directions and passes through the first and second abutting faces.

In accordance with another aspect of the invention, the bicycle front derailleur is configured to be mounted to a frame of a bicycle by a fastening piece that includes a support part having a first curved support face curved in such a manner as to have the shape of a circular arc in a cross sectional view of the support part lying in a plane normal to a first direction; and a first through hole that is elongated in a direction substantially parallel to the first direction and runs through the first curved support face substantially in a second direction perpendicular to the first direction. The bicycle front derailleur is mounted in such a manner that it can swing about the center of curvature of the arc-shaped first support face and move along a path substantially parallel to the first direction. This front derailleur is provided with the intermediate piece that is disposed between the support part (more specifically, the first curved support face) of the fastening piece and the mounting part (more specifically, the mounting face) of the front derailleur main body and provided with a first abutting face, a second abutting face, and a second through hole. The front derailleur main body can be swung about the center of curvature of the first curved support face because the first curved support face and the second abutting face are both curved in such a manner as to have the shape of a circular arc in cross sectional views lying in a plane normal to the first direction and moved along a path substantially parallel to the first direction because the first through hole of the support part is elongated in a direction substantially parallel to the first direction. Additionally, the front derailleur main body can be swung about the center of curvature of the mounting face because the mounting face and the first abutting face are both curved in such a manner as to have the shape of a circular arc in cross sectional views lying in a plane normal to the third direction. Thus, the mounting position of the front derailleur can be adjusted in three different directions with respect to the fastening piece. As a result, the degree of freedom with which the mounting position of the front derailleur can be adjusted with respect to the fastening piece is increased and the front derailleur can be mounted accurately in the prescribed position even if the fastening piece is installed imprecisely to the bicycle frame.

In accordance with another aspect of the invention, the bicycle front derailleur is configured such that the second through hole is elongated in a direction substantially parallel to the first direction. With this front derailleur, since the second through hole is elongated in a direction substantially parallel to the first direction, the front derailleur main body can be swung over a wider angular range when it is swung about the center of curvature of the mounting face.

In accordance with another aspect of the invention, the bicycle front derailleur is configured such that a washer is arranged between the head of the fastening screw and a second curved support face of the support part, the second curved support face being on the opposite side of the support part as the first curved support face and facing in a direction substantially parallel to the second direction. The washer has a third curved abutting face facing the second curved support face, a fourth curved abutting face facing the head of the fastening screw, and a third through hole that runs in a direction substantially parallel to the second direction and passes through the third curved abutting face and the fourth curved abutting face. The mounting part has a screw threaded hole that passes through the mounting face and runs in a direction substantially parallel to the second direction. The fastening screw is passed through the third through hole from the fourth curved abutting face side of the washer, passed through the first and second through holes in a direction substantially parallel to the second direction, and screwed into the screw threaded hole of the mounting part.

In accordance with another aspect of the invention, the bicycle front derailleur is configured such that the second curved support face is curved in such a manner as to have the shape of a circular arc in a cross sectional view of the support part lying in a plane normal to the first direction; and the third curved abutting face is curved in a manner corresponding to the contour of the second curved support face in a cross sectional view of the washer lying in a plane normal to the first direction. With this front derailleur, since both the second curved support face of the support part and the third curved abutting face of the washer are curved in such a manner as to have the shape of a circular arc in cross sectional views lying in a plane normal to the first direction, the surfaces of the second curved support face and the third curved abutting face can maintain good contact with each other even if the relative positions of the second curved support face and the third curved abutting face are offset from each other when the mounting position of the front derailleur is adjusted by swinging the front derailleur main body about the center of curvature of the first curved support face and changing the relative position of the second abutting face of the intermediate piece with respect to the first curved support face.

In accordance with another aspect of the invention, the bicycle front derailleur is configured such that the fourth curved abutting face is curved in a spherical manner and the face of the head portion of the fastening screw that abuts against the fourth curved abutting face is curved in a manner corresponding to the contour of the fourth curved abutting face. With this front derailleur, since the fourth curved abutting face of the washer and the face of the head of the fastening screw that abuts against the fourth curved abutting face are both curved in a spherical manner, the fourth curved abutting face and the head of the fastening screw can maintain good contact with each other even if the relative positions of the fourth curved abutting face and the head of the fastening screw are offset from each other when the mounting position of the front derailleur is adjusted by swinging the front derailleur main body about the center of curvature of the mounting face of the mounting part and changing the relative position of the first abutting face of the intermediate piece with respect to the mounting face.

In accordance with another aspect of the invention, the bicycle front derailleur is configured such that a second intermediate piece that is arranged between the mounting face of the mounting part and the first curved support face of the support part and has the following: a fifth curved abutting face curved in a manner corresponding to the contour of mounting face of the mounting part in a cross sectional view of the intermediate piece lying in a plane normal to the third direction; a sixth curved abutting face curved in a manner corresponding to the contour of the first curved support face of the support part in a cross sectional view of the intermediate piece lying in a plane normal to the first direction; and a fourth through hole that runs in a direction substantially parallel to the second direction and passes through the fifth curved abutting face and the sixth curved abutting face. The thickness of the second intermediate piece in the second direction is different than that of the previously mentioned intermediate piece. The fastening screw can pass through the first and fourth through holes in such a manner as to extend in a direction substantially parallel to the second direction and can fasten the mounting part to the support part. With this front derailleur, since a second intermediate piece having a different thickness in the second direction is provided, the front derailleur main body can be moved along a path substantially parallel to the second direction when the front derailleur is being mounted to the bicycle frame. Thus, the mounting position of the front derailleur can be adjusted in four directions with respect to the fastening piece. As a result, the degree of freedom with which the mounting position of the front derailleur can be adjusted with respect to the fastening piece is increased and the front derailleur can be mounted accurately in the prescribed position even if the fastening piece is installed imprecisely to the bicycle frame.

In accordance with another aspect of the invention, the bicycle front derailleur is configured such that the intermediate piece can be divided into a first section having the first abutting face and a second section having the second abutting face. When separated from the first section, the second section has a seventh curved abutting face curved in a manner corresponding to the contour of the mounting face of the mounting part in a cross sectional view of the second section lying in a plane normal to the third direction. With this front derailleur, since the intermediate piece can be divided into a first section having the first abutting face and a second section having the second abutting face, the front derailleur main body can be moved along a path substantially parallel to the second direction when the front derailleur is being mounted to the bicycle frame. Thus, the mounting position of the front derailleur can be adjusted in four directions with respect to the fastening piece. As a result, the degree of freedom with which the mounting position of the front derailleur can be adjusted with respect to the fastening piece is increased and the front derailleur can be mounted accurately in the prescribed position even if the fastening piece is installed imprecisely to the bicycle frame.

In accordance with another aspect of the invention, the bicycle front derailleur is configured such that an intermediate piece between the support part (more specifically, the first curved support face) of the fastening piece and the mounting part (more specifically, the mounting face) of the front derailleur main body. The intermediate piece has a first abutting face, a second abutting face, and a second through hole. The front derailleur main body can be swung about the center of curvature of the first curved support face and moved along a path substantially parallel to the first direction. Additionally, the front derailleur main body can be swung about the center of curvature of the mounting face because the mounting face and the first abutting face are both curved in such a manner as to have the shape of a circular arc in cross sectional views lying in a plane normal to the third direction (which is perpendicular to the first and second directions). As a result, the degree of freedom with which the mounting position of the front derailleur can be adjusted with respect to the fastening piece is increased and the front derailleur can be mounted accurately in the prescribed position even if the fastening piece is installed imprecisely to the bicycle frame.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
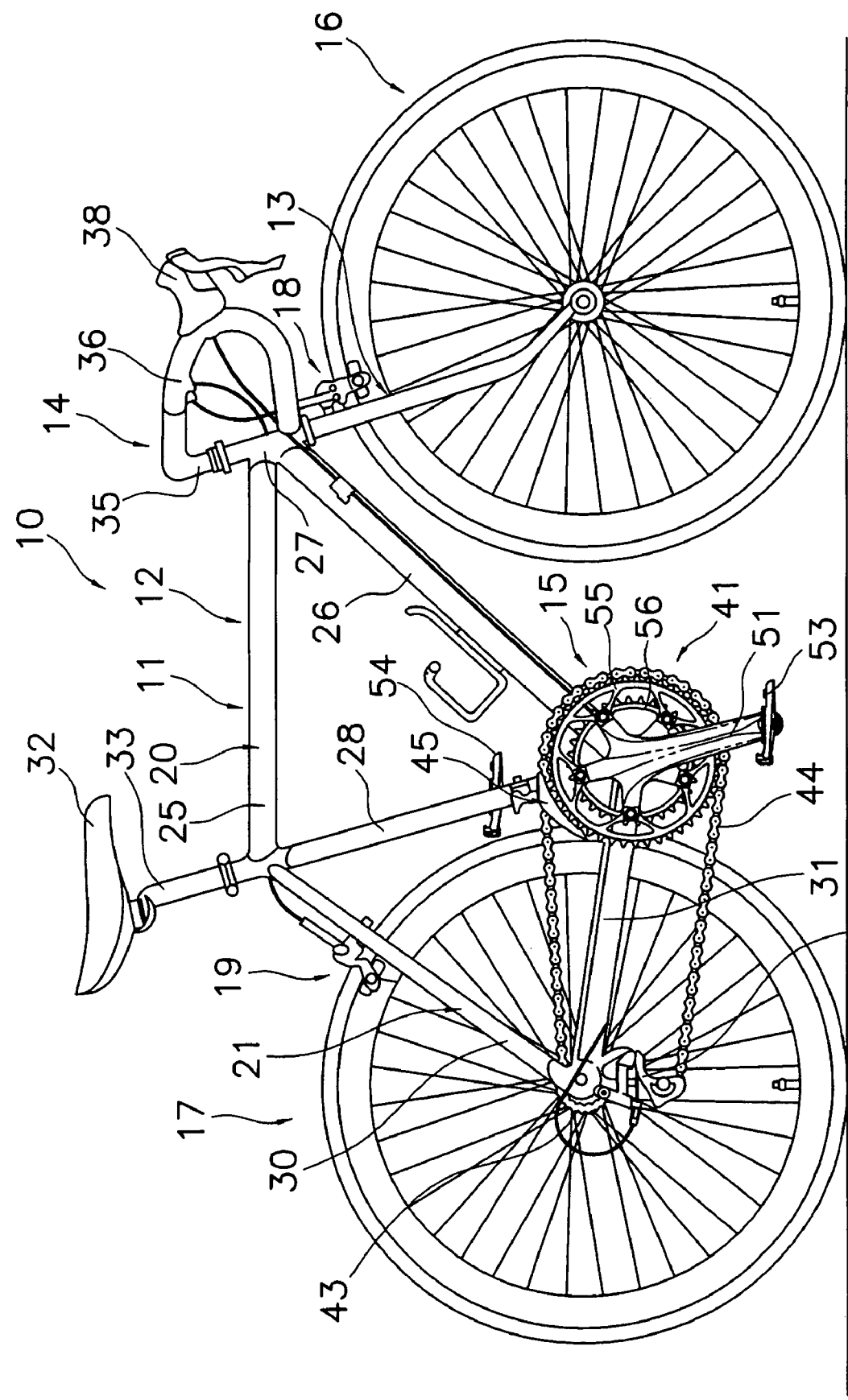
FIG. 1 is a side elevational view of a bicycle that is equipped with a bicycle front derailleur in accordance with a first embodiment of the present invention.

Referring initially to FIG. 1, a bicycle 10 is illustrated that is equipped a front derailleur 45 in accordance with a first embodiment of the present invention. In this example, the bicycle 10 is a road bike that has a diamond-shaped frame 11.

The frame 11 serves as the framework of the bicycle body. The frame 11 has a frame body 12 with a front fork 13 pivotally supported on a front part of the frame body 12 such that the front fork 13 can rotate freely about an axis that is tilted slightly from vertical. The lower part of the front fork 13 is divided into two prongs. The bicycle 10 is also provided with a drop-type handlebar unit 14 connected to the front fork 13, a drive unit 15 provided on a lower part of the frame body 12. The drive unit 15 is configured to convert pedaling force into driving force. A front wheel 16 is supported in a freely rotatable manner on the bottom end of the front fork 13, while a rear wheel 17 is supported in a freely rotatable manner on a rear part of the frame body 12. The bicycle 10 is also provided with front and rear brake devices 18 and 19.

The frame body 12 has a triangularly shaped front triangle 20 and a triangularly shaped rear triangle 21 arranged rearward of the front triangle 20. The front triangle 20 is formed by a top tube 25, a down tube 26, a head tube 27, and a seat tube 28. The top tube 25 is arranged generally horizontally, while the down tube 26 is arranged below the top tube 25 such that it slants upward toward the front. The head tube 27 joins the front ends of the top tube 25 and the down tube 26 together. The seat tube 28 extends diagonally upward and joins the rear ends of the top tube 25 and the down tube 26 together. A seat post 33 having a saddle 32 fastened thereto is secured in the seat tube 28 in such a manner that its position can be adjusted up and down. A cylindrical hanger (not shown) is formed at the portion where the seat tube 28 and the down tube 26 join together. The rear triangle 21 is formed by the seat tube 28, a pair of seat stays 30 and a pair of chain stays 31. The seat stays 30 are joined at their front ends to the seat tube 28 and extend diagonally downward as two separate prongs. The chain stays 31 extend rearward as two separate prongs from the bottom end of the seat tube 28 and are joined at their rear ends to the seat stays 30.

The handlebar unit 14 includes a handlebar stem 35 and a handlebar 36. The handlebar stem 35 of the handlebar unit 14 is fastened to the upper part of the front fork 13 in such a manner that it can be moved up and down. The handlebar 36 extends to the left and right and is curved at both ends is fastened to the top end of the handlebar stem 35. Brake levers 38 provided with gear shifting capability are mounted to both ends of the handlebar 36.

The drive unit 15 basically includes a front crankset 41, a rear gear cassette unit 43, a chain 44, a front derailleur 45, and a rear derailleur 46. The front crankset 41 is provided on the bottom bracket of the bicycle 10. The rear gear cassette unit 43 is mounted in a non-rotatable manner to the free hub of the rear wheel 17. The chain 44 is arranged on the front crankset 41 and the rear gear cassette unit 43 so as to span therebetween. The front derailleur 45 and the rear derailleur 46 function as gear changing devices. The front crankset 41 includes a crank shaft (not shown) supported in a freely rotatable manner in the bottom bracket of the frame 11, a right crank arm 51 that is fastened to the right end of the crank shaft with a pedal 53 mounted to its tip end, and a plurality of different sized sprockets 55 and 56 (two in this embodiment) mounted so as to be centered on the center axis of the bottom bracket. A left crank (not shown) that is fastened to the left end of the crank shaft and has a pedal 54 mounted to its tip end.

The front derailleur 45 will now be described with reference to FIGS. 2 to 7. As used herein to describe the front derailleur 45 and the other parts of the bicycle 10, the following directional terms "forward, rearward, above, downward, vertical, horizontal, below and transverse" as well as any other similar directional terms refer to those directions of a bicycle equipped with the front derailleur 45 of the present invention. Accordingly, these terms, as utilized to describe the present invention should be interpreted relative to a bicycle equipped with the front derailleur 45 of the present invention.

Figure 2:
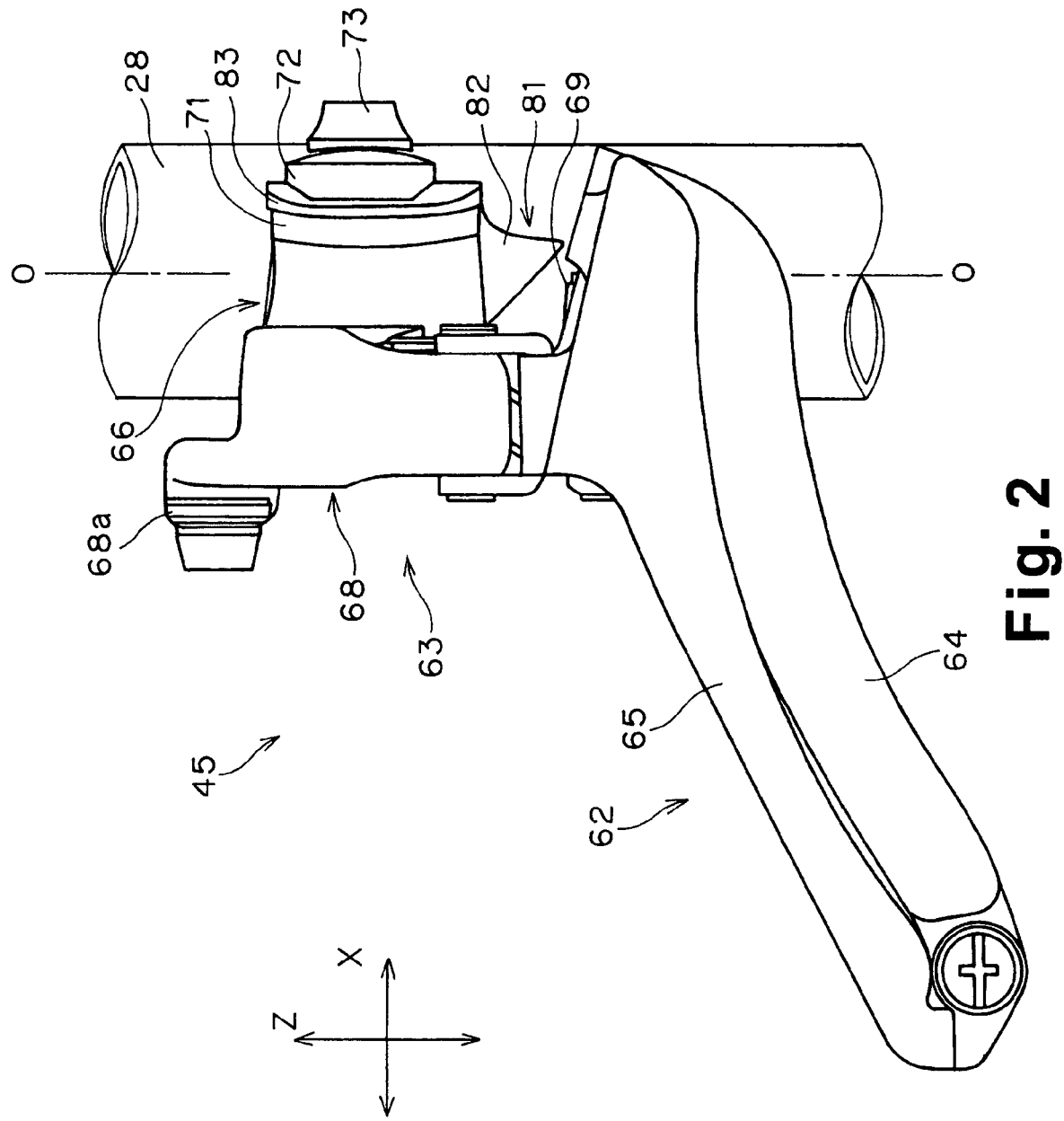
FIG. 2 is a side view showing the front derailleur mounted to the fastening piece and thereby to the frame of the bicycle.
Figure 3:
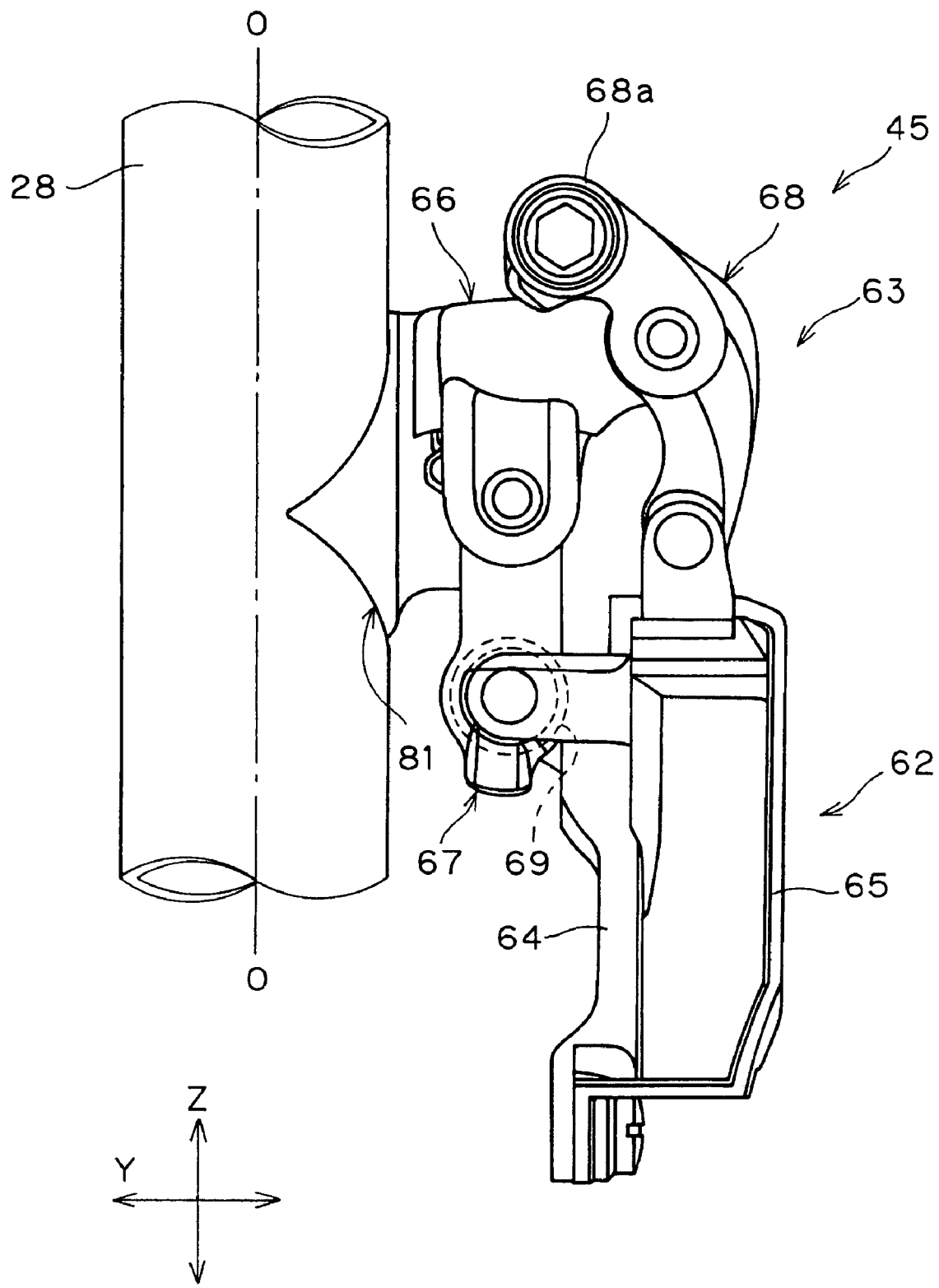
FIG. 3 is a rear view showing the front derailleur mounted to the fastening piece and thereby to the frame of the bicycle.
Figure 4:
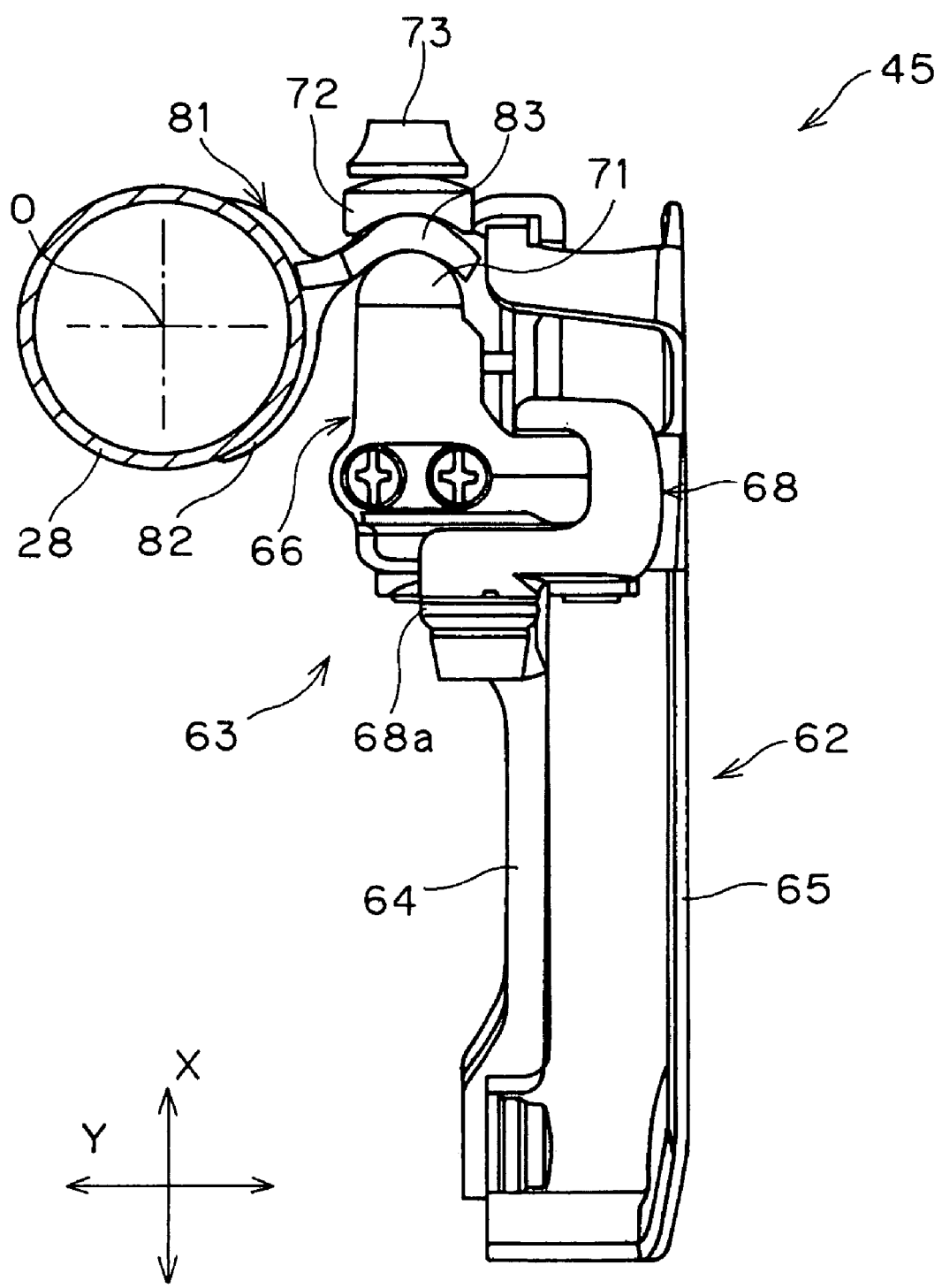
FIG. 4 is a to plan view showing the front derailleur mounted to the fastening piece and thereby to the frame of the bicycle.
Figure 5:
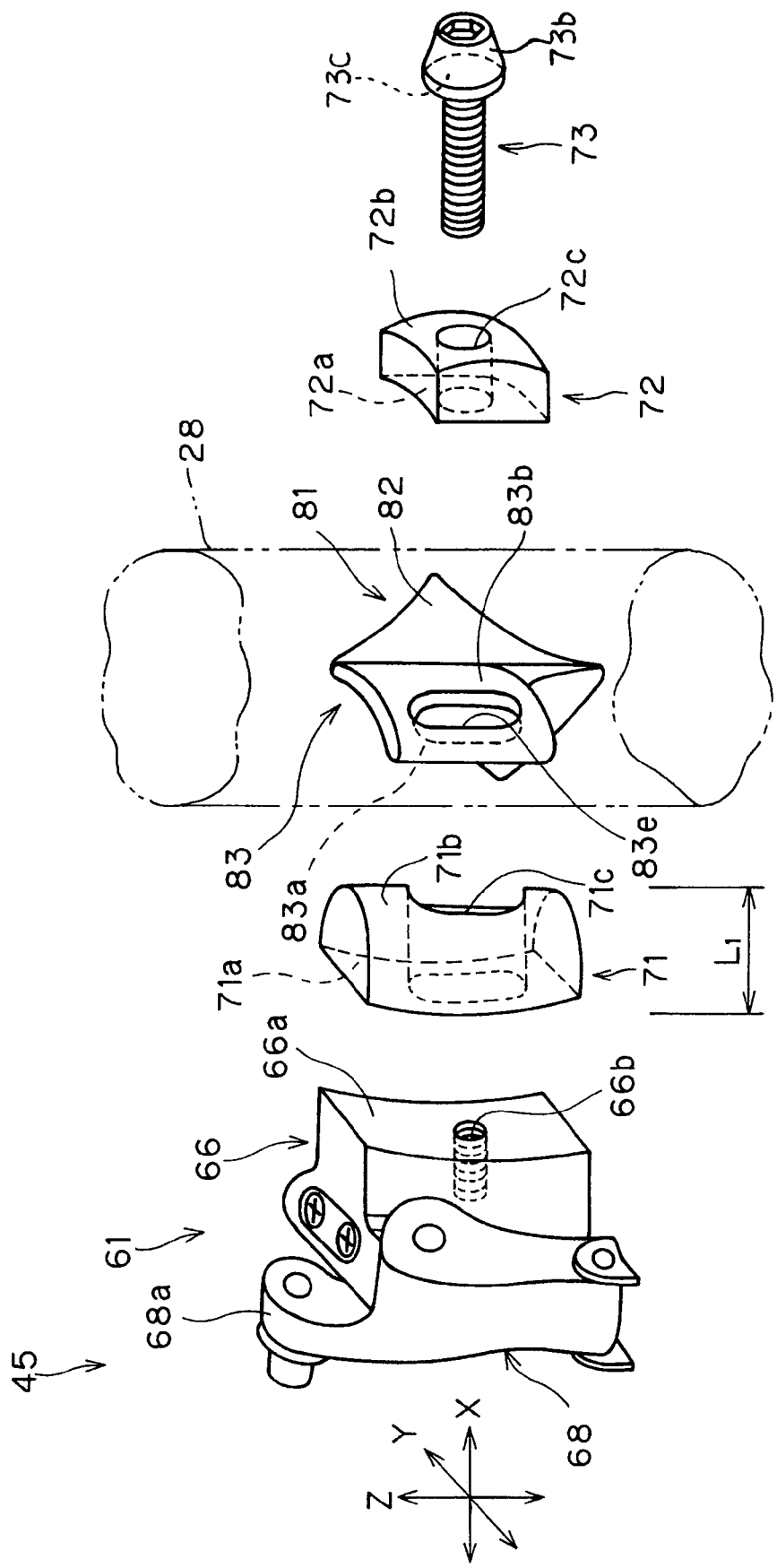
FIG. 5 is an exploded perspective view showing the structure used to mount the mounting part of the front derailleur to the fastening piece.
Figure 6:
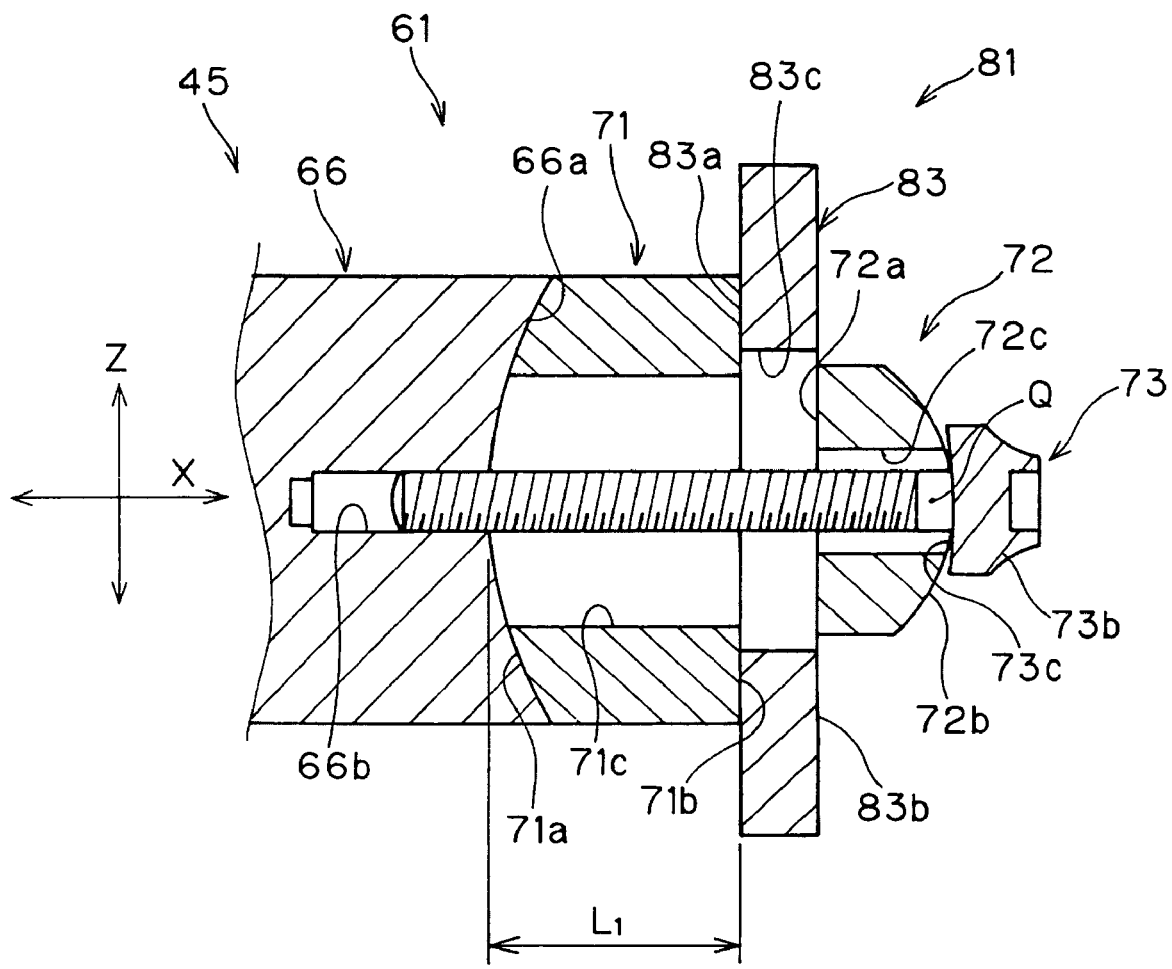
FIG. 6 is a simplified side cross sectional view showing the mounting part of the front derailleur mounted to the fastening piece.
Figure 7:
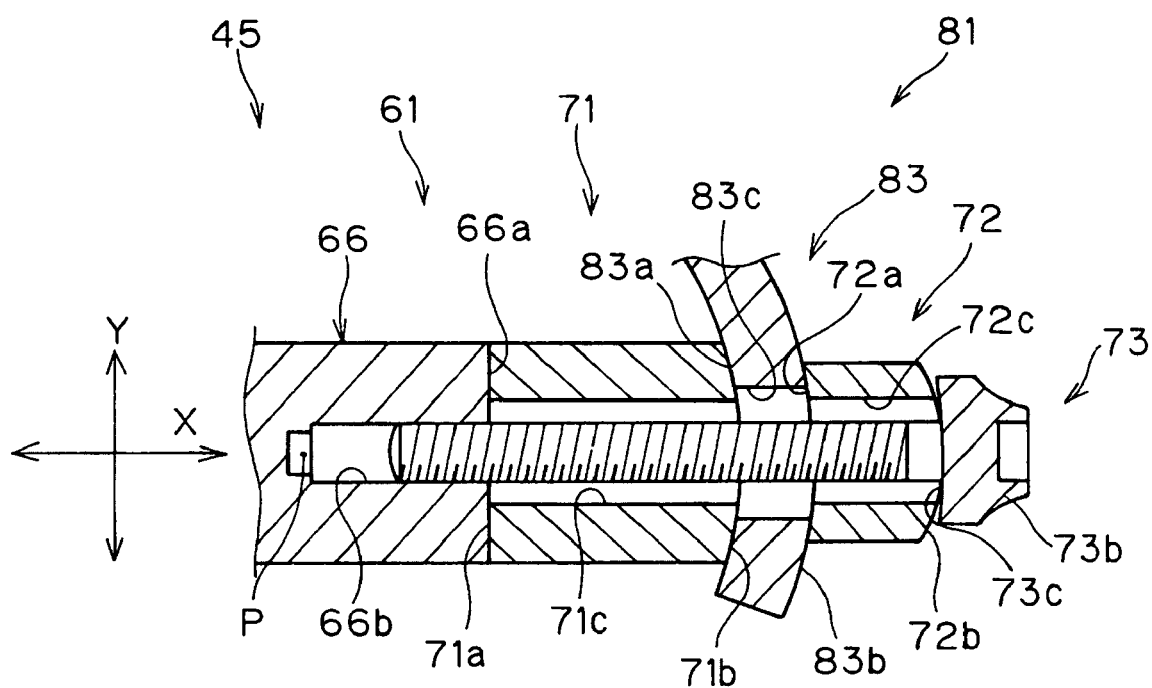
FIG. 7 is a simplified top plan cross sectional view showing the mounting part of the front derailleur mounted to the fastening piece.

FIGS. 2, 3, and 4 are a side view, a rear view, and a plan view, respectively, showing the front derailleur 45 mounted to a fastening piece 81 and, thereby, to the frame 11. FIG. 5 is an exploded perspective view illustrating the structure used for mounting the mounting part 66 of the front derailleur 45 to the fastening piece 81. FIGS. 6 and 7 are simplified side cross sectional and top plan cross sectional views, respectively, showing the mounting part 66 of the front derailleur 45 mounted to the fastening piece 81. Since the seat tube 28 to which the front derailleur 45 is mounted is slanted such that its lower end is positioned further forward than its upper end in this embodiment, the directions or coordinate system used to describe this embodiment will be defined for convenience as follows: the direction running in the traverse or lateral direction to the bicycle 10 will be called the Y direction (first direction), the direction corresponding to the center axis O-O of the seat tube 28 will be called the Z direction (second direction), and the direction perpendicular to the center axis O-O and running generally in the longitudinal direction of the bicycle 10 will be called the X direction (third direction). The X, Y, and Z directions will also be used when describing the front derailleur 45 itself, i.e., when it is in an independent state and not mounted to the fastening piece 81.

The overall configuration of the front derailleur 45 will now be described. The front derailleur 45 basically includes a front derailleur main body 61, a chain guide 62 and a four bar-link mechanism 63 and a mounting part 66. The chain guide 62 serves to shift the chain 44 (shown in FIG. 1) in generally the Y-direction. The chain guide 62 basically includes an inner guide plate 64 and an outer guide plate 65 that is spaced away from the inner guide plate 64 in a direction opposite the direction in which the seat tube 28 is located. The four bar-link mechanism 63 is a mechanism configured to move the chain guide 62 along a path substantially parallel to the Y-direction and basically includes a section of the chain guide 62, a section of the mounting part 66, an inner swing link 67 pivotally connected to the mounting part 66, an outer swing link 68 pivotally connected to the mounting part 66, and a return spring 69. The mounting part 66 is the member that is mounted to the seat tube 28 by the fastening piece 81. The inner swing link 67 and the outer swing link 68 function to link the chain guide 62 and the mounting part 66 together in such a manner that the chain guide 62 can be moved along a path substantially parallel to the Y direction with respect to the mounting part 66. The return spring 69 is a torsional coil spring that applies a force in the opposite direction of the movement when the chain guide 62 is moved substantially in the Y direction with respect to the mounting part 66. The return spring 69 is mounted on a shaft connecting the inner swing link 67 and the inner guide plate 64. The outer swing link 68 is provided with an operating arm 68a configured for attaching a gear shifting wire (not shown) that is operated in order to shift gears in a conventional manner.

Thus, the front derailleur 45 further includes an adjustable mounting structure that basically includes a portion of the mounting part 66, an intermediate piece 71, a washer 72, and a fastening screw 73. This adjustable mounting structure mounts the front derailleur 45 to the fastening piece 81 such that the orientation of the front derailleur 45 relative to the seat tube 28 can be easily adjusted as explained below.

The fastening piece 81 will now be described with reference to FIGS. 2 to 7. The fastening piece 81 basically includes a fixing part 82 and a support part 83. The fixing part 82 is configured to be fixed to the outside surface of the seat tube 28 by welding or the like, while the support part 83 is configured to extend in a direction substantially parallel to the Y-direction from the outside surface of the fixing part 82. The fixing part 82 and the support part 83 are integrally coupled together. Preferably, the fixing part 82 and the support part 83 are formed as a one-piece, unitary member.

In this embodiment, the fixing part 82 is a generally diamond-shaped plate-like part having a curved face corresponding to the outside surface of the seat tube 28. The support part 83 in this embodiment is a generally rectangular plate-like part that is elongated in the Z direction. The support part 83 is curved to form a circular arc in a cross sectional view of the support part 83 that lies in a plane parallel to the Y direction (normal to the Z direction). More specifically, the support part 83 is curved in the shape of an arc that bulges outward on the side thereof that faces away from the mounting part 66. Thus, the support part 83 has a first curved support face 83a and a second curved support face 83b.

The first curved support face 83a faces the mounting part 66, which is also curved to form a curved mating surface. In other words, the mounting part 66 and the first curved support face 83a are curved mating surface with a circular arc in a cross sectional view of the support part that lie in a plane parallel to the Y direction (normal to the Z direction). The second curved support face 83b is on the opposite side of the support part 83 as the first curved support face 83a. Additionally, in this embodiment, the arc of the first curved support face 83a and the arc of the second curved support face 83b are both centered on the same center pivot point P shown in FIG. 7. More specifically, the arc of the first curved support face 83a and the arc of the second curved support face 83b are both centered on the same axis that is oriented in the Z direction and includes the point P. The support part 83 is also provided with a first through hole 83c that runs substantially in the X direction and passes through the first curved support face 83a and the second curved support face 83b. The first through hole 83c is elongated in a direction substantially parallel to the Z direction and both the Y dimension and the Z dimension of the through hole 83c are larger than the thread diameter of the fastening screw 73 (discussed later).

The mounting part 66 and structure for mounting the mounting part 66 to the fastening piece 81 will now be described.

The mounting part 66 is arranged facing the first curved support face 83a of the support part 83 of the fastening piece 81. The mounting part 66 has a curved mounting face 66a with a circular arc in a cross sectional view of the mounting part 66 that lies in a plane parallel to the Z direction (normal to the Y direction). More specifically, the curved mounting face 66a is curved in the shape of an arc that bulges away from the support part 81. The mounting part 66 has a screw threaded hole 66b that runs in a direction substantially parallel to the X direction and passes through the curved mounting face 66a. The arc of the curved mounting face 66a is centered on the point Q shown in FIG. 6. More specifically, the arc of the curved mounting face 66a is centered on an axis that runs in the Y direction and includes the point Q.

The intermediate piece 71 is arranged between the curved mounting face 66a and the first curved support face 83a. In this embodiment, the intermediate piece 71 is a generally rectangular cube-shaped member that is elongated in the X direction. The intermediate piece 71 has a first curved abutting face 71a, a second curved abutting face 71b and a second through hole 71c. The first curved abutting face 71a is curved in a manner corresponding to the contour of the curved mounting face 66a. The first curved abutting face 71a forms an arc in a cross sectional view of the intermediate piece 71 that lies in a plane parallel to the Z direction (normal to the Y direction). The second curved abutting face 71b is curved in a manner corresponding to the contour of the first curved support face 83a. The second curved abutting face 71b forms an arc in a cross sectional view of the intermediate piece 71 that lies in a plane parallel to the Y direction (normal to the Z direction). The second through hole 71c of the intermediate piece 71 extends substantially in the X direction and passes through the first curved abutting face 71a and the second curved abutting face 71b. The second through hole 71c is elongated in a direction substantially parallel to the Z direction. Also, both the Y dimension and the Z dimension of the second through hole 71c are larger than the thread diameter of the fastening screw 73 (discussed later).

A washer 72 is arranged on the second curved support face 83b side of the support part 83. In this embodiment, the washer 72 is a generally rectangular cube-shaped member that is smaller in size than the intermediate piece 71. The washer 72 is provided with a third curved abutting face 72a, a fourth curved abutting face 72b and a third through hole 72c. The third curved abutting face 72a faces the second curved support face 83b. The fourth curved abutting face 72b is located on the opposite side of the washer 72 as the third curved abutting face 72a. The third through hole 72c runs in a direction substantially parallel to the X direction and passes through the third curved abutting face 72a and the fourth curved abutting face 72b. The third curved abutting face 72a is curved in a manner corresponding to the contour of the second curved support face 83b. The third curved abutting face 72a forms an arc in a cross sectional view of the washer 72 that lies in a plane parallel to the Y direction (normal to the Z direction). The fourth curved abutting face 72b is curved in a spherical manner. The third through hole 72c has a larger diameter than the thread diameter of the fastening screw 73 (discussed later).

The front derailleur 45 is mounted to the fastening piece 81, and thereby, to the seat tube 28 by stacking the mounting part 66 of the front derailleur main body 61, the intermediate piece 71, the support part 83 of the fastening piece 81, and the washer 72 in the X direction and passing the fastening screw 73 through the third through hole 72c from the fourth curved abutting face 72b side of the washer 72. After passing through the first through hole 83c and the second through hole 71c so as to extend in a direction substantially parallel to the X direction, the fastening screw 73 is screwed into the threaded hole 66b. The face 73c of the head 73b of the fastening screw 73 that contacts the fourth curved abutting face 72b is curved in a manner corresponding to the contour of the fourth curved abutting face 72b (i.e., is curved in a spherical manner).

Thus, the front derailleur 45 is made up of the front derailleur main body 61 (which includes the mounting part 66), the intermediate piece 71, the washer 72, and the fastening screw 73.

Figure 8:
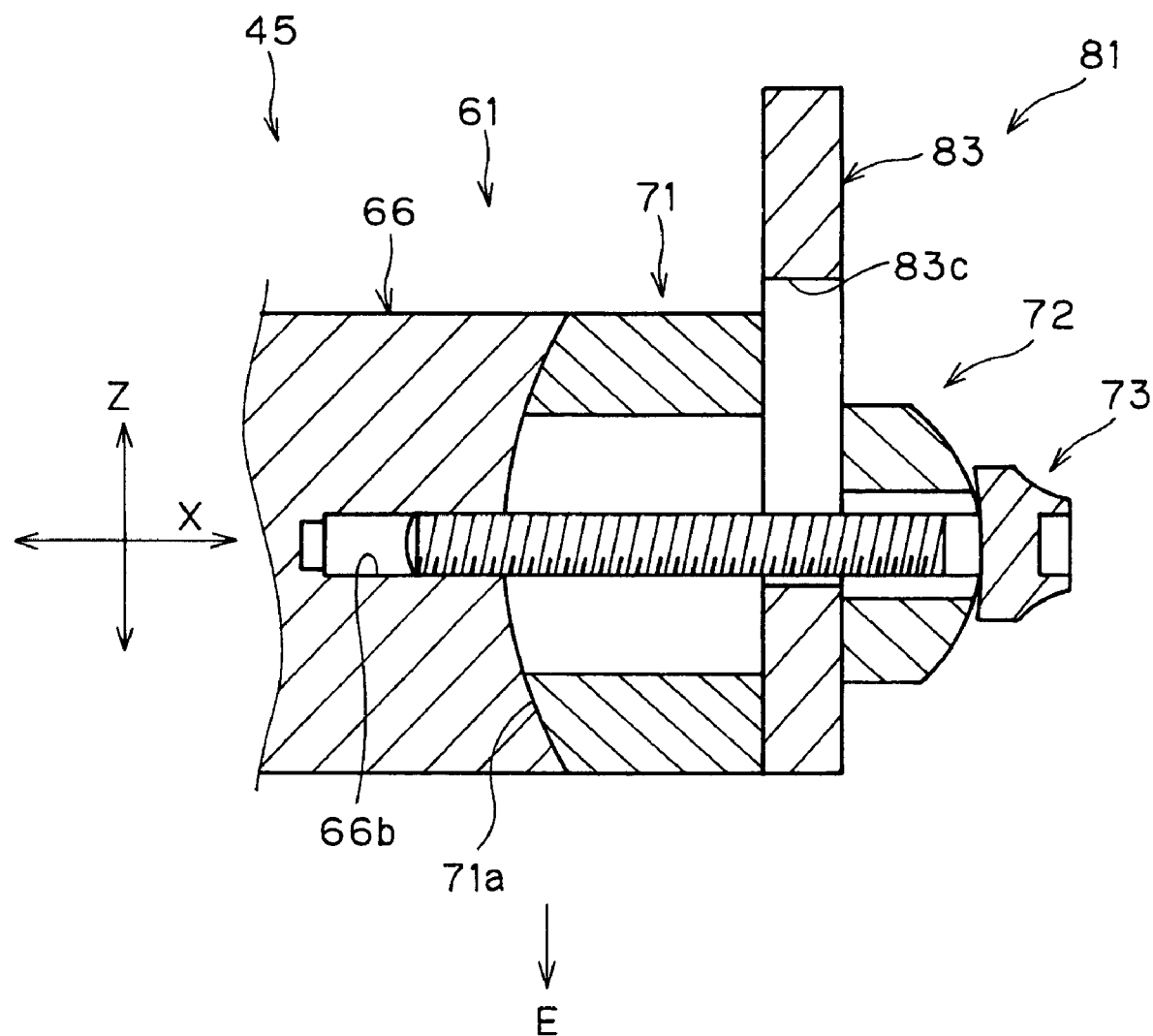
FIG. 8 corresponds to FIG. 6 and illustrates a case in which the mounting position of the front derailleur has been adjusted downward with respect to the fastening piece.
Figure 9:
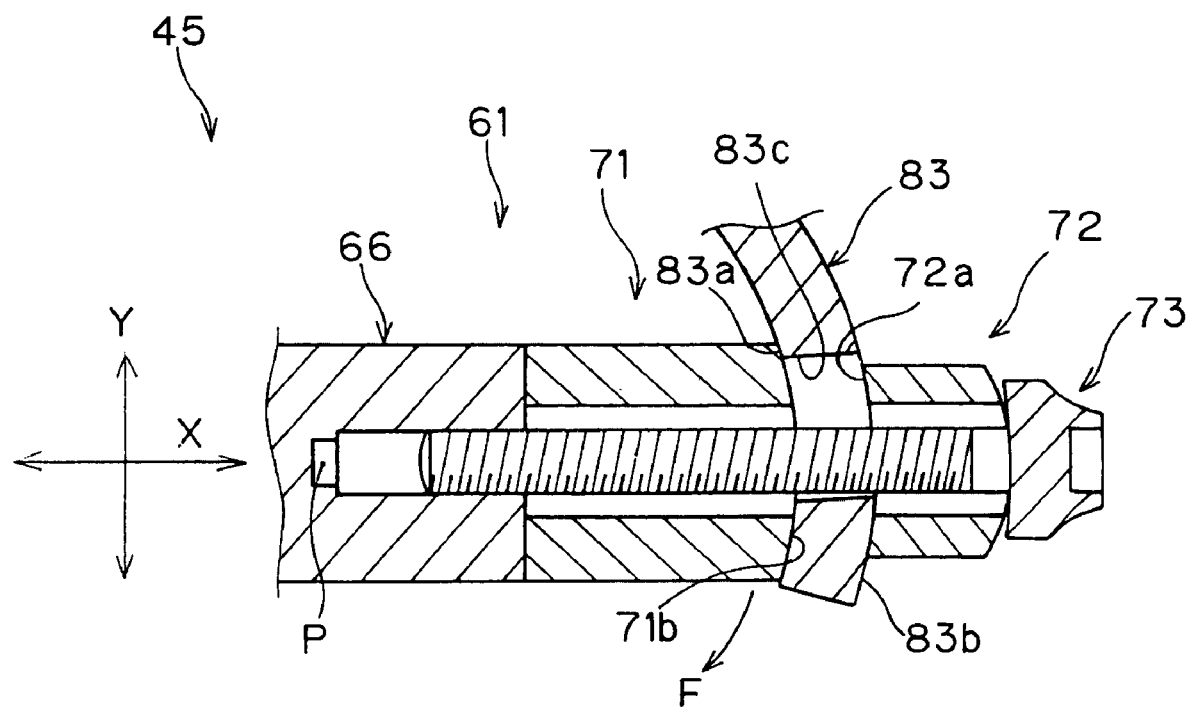
FIG. 9 corresponds to FIG. 7 and illustrates a case in which the mounting position has been adjusted by swinging the front derailleur transversely with respect to the fastening piece.
Figure 10:
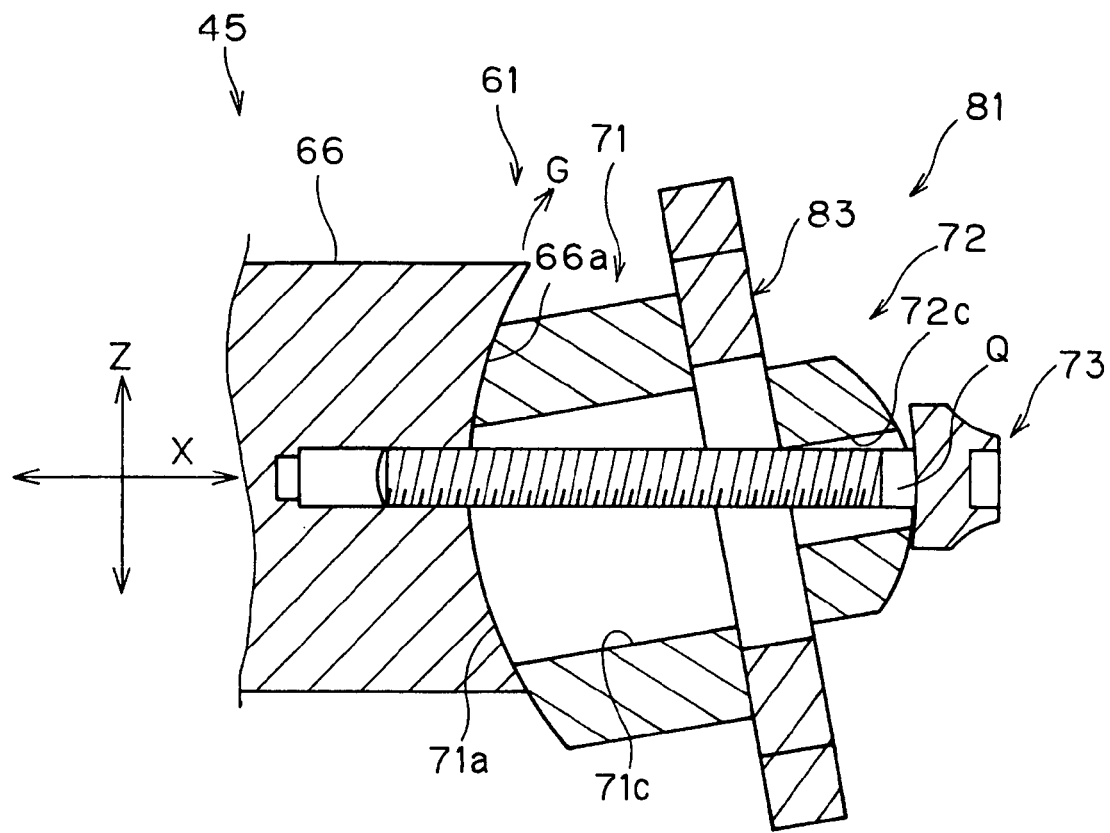
FIG. 10 corresponds to FIG. 6 and illustrates a case in which the mounting position has been adjusted by swinging the front derailleur upward with respect to the fastening piece.

The adjustment of the mounting position of the front derailleur 45 with respect to the fastening piece 81 will now be described with reference to FIGS. 8, 9, and 10. FIG. 8 corresponds to FIG. 6 and illustrates a case in which the mounting position of the front derailleur 45 has been adjusted downward with respect to the fastening piece 81. FIG. 9 corresponds to FIG. 7 and illustrates a case in which the mounting position has been adjusted by swinging the front derailleur 45 in a direction transverse with respect to the fastening piece 81. FIG. 10 corresponds to FIG. 6 and illustrates a case in which the mounting position has been adjusted by swinging the front derailleur 45 upward with respect to the fastening piece 81.

First, upward and downward movement of the front derailleur 45 along the Z direction will be discussed. Since the first through hole 83c of the support part 83 of the fastening piece 81 is elongated substantially in the Z direction, the positions of the mounting part 66, the intermediate piece 71, and the washer 72 with respect to the support part 83 can be moved along a path substantially parallel to the Z direction within the limits of the Z-dimension of the first through hole 83c, as shown in FIG. 8. In other words, the mounting part 66, the intermediate piece 71, and the washer 72 can be moved in the direction indicated by arrow E with respect to the fastening piece 81 within the limits of the Z-dimension of the first through hole 83c, as shown in FIG. 8. As a result, in cases where the fixing part 82 of the fastening piece 81 has been mounted imprecisely to the seat tube 28 in such a manner as to be offset upward or downward from where it should be, the mounting position of the front derailleur 45 can be adjusted along the Z direction such that the prescribed mounting position with respect to the sprockets 55 and 56 and chain 44 (shown in FIG. 1) is obtained.

Now, the transverse swing movement (rotation about point P) will be discussed. Since the first curved support face 83a of the fastening piece 81 is curved to form a circular arc in a cross sectional view of the support part 83 that lies in a plane normal to the Z direction and the second curved abutting face 71b of the intermediate piece 71 is curved in a manner corresponding to the contour of the first curved support face 83a, the positions of the mounting part 66, the intermediate piece 71, and the washer 72 can be swung about the point P, i.e., the center of curvature of the first curved support face 83a relative to the support part 83, within the limits of the Y dimension of the first through hole 83c, as shown in FIG. 9. In other words, the mounting part 66, the intermediate piece 71, and the washer 72 can be swung in the direction indicated by the arrow F with respect to the fastening piece 81 within the limits of the Y dimension of the first through hole 83c, as shown in FIG. 9. Additionally, since the second curved support face 83b of the support part 83 is curved to form a circular arc in a cross sectional view of the support part 83 that lies in a plane normal to the Z direction and the third curved abutting face 72a of the washer 72 is curved in a manner corresponding to the contour of the second curved support face 83b, the second curved support face 83b and the third curved abutting face 72a can be made to have good surface contact. As a result, in cases where the fixing part 82 of the fastening piece 81 has been mounted imprecisely to the seat tube 28 in such a manner as to be offset from where it should be in the direction of rotation around the center axis O-O, the mounting position of the front derailleur 45 can be adjusted by swinging it transversely (laterally) such that the prescribed mounting position with respect to the sprockets 55 and 56 and the chain 44 (shown in FIG. 1) is obtained.

Now, the vertical swing movement (swinging about point Q) will be discussed. Since the curved mounting face 66a of the mounting part 66 is curved to form a circular arc in a cross sectional view of the mounting part 66 that lies in a plane normal to the Y direction and the first curved abutting face 71a of the intermediate piece 71 is curved in a manner corresponding to the contour of the curved mounting face 66a, the position of the mounting part 66 relative to the intermediate piece 71, the support part 83, and the washer 72 can be swung about the point Q, i.e., the center of curvature of curved mounting face 66a, within the limits of the Z dimensions of the second through hole 71c and the third through hole 72c, as shown in FIG. 10. In other words, the mounting part 66 can be swung in the direction indicated by the arrow G with respect to the fastening piece 81. Additionally, since the second through hole 71c is elongated in the Z-direction, the angular range over which the mounting part 66 can be swung can be increased. In this embodiment, the mounting part 66 can be swung until the fastening screw 73 contacts the third through hole 72c, as shown in FIG. 10. Although the position of the fastening screw 73 relative to the washer 72 changes when the mounting part 66 is swung, good surface contact can be maintained between the fourth abutting surface 72b and the face 73c of the screw head 73b of the fastening screw 73 because the fourth abutting surface 72b and the face 73c of the screw head 73b are spherical faces. As a result, when sufficient adjustment cannot be achieved by moving the front derailleur 45 up and down along the Z dimension of the first through hole 83c or when one wishes to move only the rear end portion of the chain guide 62 (see FIG. 2), the mounting position of the front derailleur 45 can be adjusted by swinging it vertically such that the prescribed mounting position with respect to the sprockets 55, 56 and chain 44 (shown in FIG. 1) is obtained.

In summary, the front derailleur 45 in accordance with this embodiment is provided with the intermediate piece 71 that is disposed between the support part 83 (more specifically, the first curved support face 83a) of the fastening piece 81 and the mounting part 66 (more specifically, the curved mounting face 66a) of the front derailleur main body 61 and provided with the first curved abutting face 71a, the second curved abutting face 71b, and the second through hole 71c. The front derailleur main body 61, thus constructed, can be: (1) moved (adjusted) along a path substantially parallel to the Z direction because the first through hole 83c of the support part 83 is elongated in a direction substantially parallel to the Z direction; (2) swung about the center of curvature P of the first curved support face 83a because the first curved support face 83a and the second curved abutting face 71b are both curved to form circular arcs in cross sectional views that lie in a plane normal to the Z direction; and (3) swung about the center of curvature Q of the curved mounting face 66a because the curved mounting face 66a and the first curved abutting face 71a are both curved to form circular arcs in cross sectional views that lie a plane normal to the Y direction. Thus, the mounting position of the front derailleur 45 can be adjusted in three different directions with respect to the fastening piece 81. As a result, the degree of freedom with which the mounting position of the front derailleur 45 can be adjusted with respect to the fastening piece 81 is increased and the front derailleur 45 can be mounted accurately in the prescribed position even if the fastening piece 81 is installed imprecisely to the bicycle frame 11 (i.e., the seat tube 28 in this embodiment).

Second Embodiment

Figure 11:
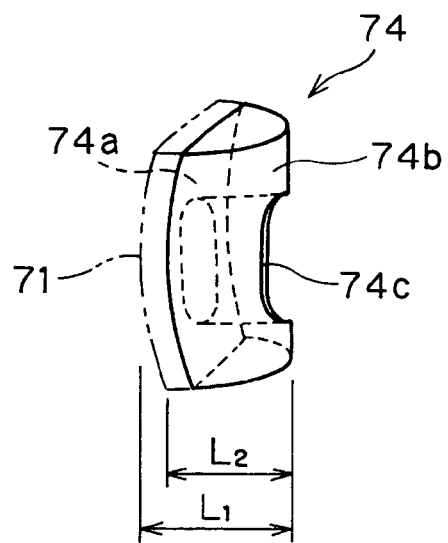
FIG. 11 is a perspective view of an auxiliary intermediate piece in accordance with a second embodiment of the front derailleur.
Figure 12:
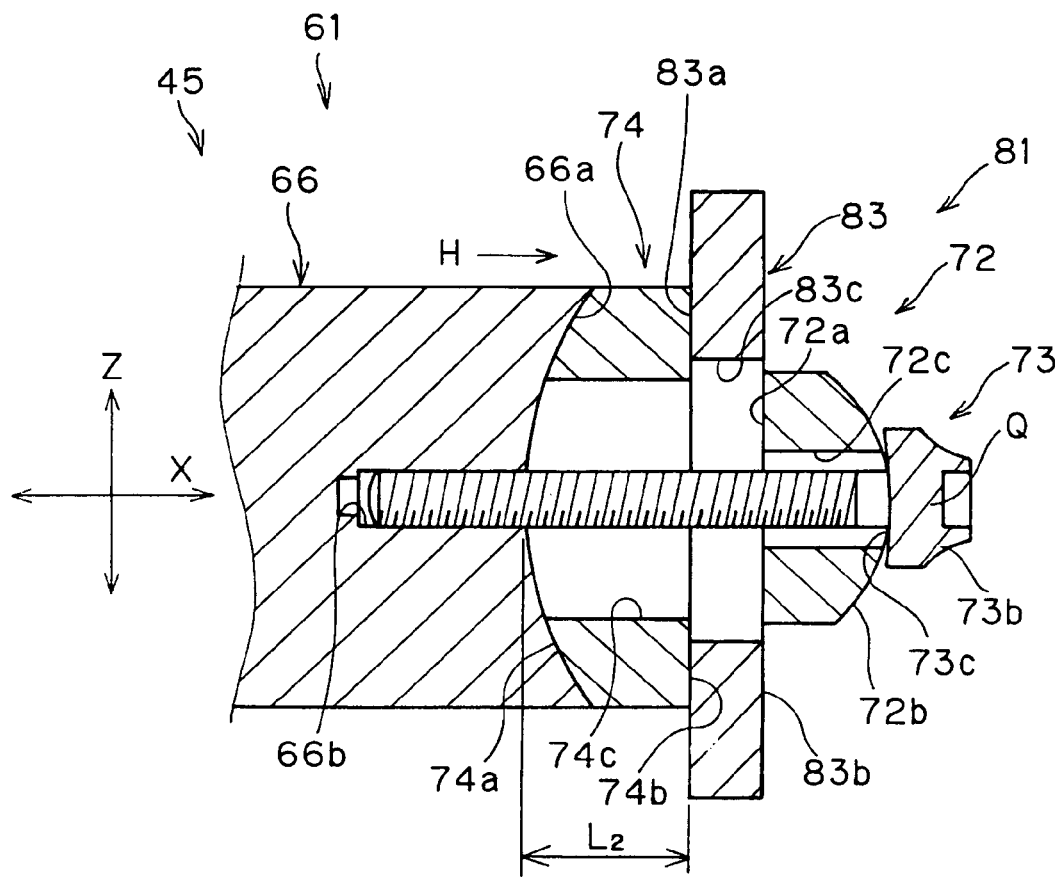
FIG. 12 corresponds to FIG. 6 and illustrates a case in which an auxiliary intermediate piece in accordance with the second embodiment has been used to adjust the mounting position of the front derailleur with respect to the fastening piece in the longitudinal direction of the bicycle.

Referring now to FIGS. 11 and 12, a second auxiliary intermediate piece 74 in accordance with a second embodiment is illustrated that replaces the intermediate piece 71 of the first embodiment. The second auxiliary intermediate piece 74 will now be explained as being incorporated into the front derailleur 45 that was described in the previous embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The front derailleur 45 described in the previous embodiment uses an intermediate piece 71 (shown in FIG. 5) having a length L1 in the X direction. In addition to the intermediate piece 71, it is also acceptable to provide a second auxiliary intermediate piece 74 having a length L2 in the X direction that is shorter than the length L1 of the intermediate piece 71, as shown in FIG. 11.

Similarly to the intermediate piece 71, the auxiliary intermediate piece 74 is a generally rectangular cube-shaped member that is elongated in the X direction and arranged between the curved mounting face 66a and the first curved support face 83a. It has a fifth curved abutting face 74a that is curved in a manner corresponding to the contour of the curved mounting face 66a in a cross sectional view of the auxiliary intermediate piece 74 lying in a plane normal to the Y direction and a sixth curved abutting face 74b that is curved in a manner corresponding to the contour of the first curved support face 83a in a cross sectional view of the auxiliary intermediate piece 74 lying in a plane normal to the Z direction. The auxiliary intermediate piece 74 is also provided with a fourth through hole 74c that runs substantially in the X direction and passes through the fifth curved abutting face 74a and the sixth curved abutting face 74b. The fourth through hole 74c is elongated in a direction substantially parallel to the Z direction and both the Y dimension and the Z dimension of the fourth through hole 74c are larger than the thread diameter of the fastening screw 73. Thus, the auxiliary intermediate piece 74 can be used instead of the intermediate piece 71.

As shown in FIG. 12, when the auxiliary intermediate piece 74 is installed between the mounting part 66 of the front derailleur main body 61 and the support part 83 instead of the intermediate piece 71, the position of the mounting part 66 with respect to the support part 83 and the washer 72 changes in the X direction by the difference between the X dimension (length) L1 of the intermediate piece 71 (shown in FIG. 6) and the X dimension (length) L2 of the auxiliary intermediate piece 74 (more specifically, the mounting part 66 moves in the direction of the arrow H with respect to the fastening piece 81). Since the fastening screw 73 must be inserted more deeply into the screw threaded hole 66b in order to accommodate the change in position of the mounting part 66, the screw threaded hole 66b is made to have sufficient depth to enable the fastening screw 73 to be tightened securely.

As a result, in cases where the fixing part 82 of the fastening piece 81 has been mounted imprecisely to the seat tube 28 in such a manner as to be offset from where it should be in the longitudinal direction of the bicycle, the mounting position of the front derailleur 45 can be adjusted by moving it in the X direction (i.e., longitudinally) such that the prescribed mounting position with respect to the sprockets 55 and 56 and chain 44 (shown in FIG. 1) is obtained.

In short, this embodiment of the front derailleur 45 enables the mounting position of the front derailleur 45 with respect to the fastening piece 81 to be adjusted in a fourth direction, i.e., the longitudinal direction (longitudinal movement), in addition to the three directions already described (i.e., upward and downward movement, transverse swinging, and vertical swinging), by selectively switching between the intermediate piece 71 and the auxiliary intermediate piece 74.

Thus, this embodiment further increases the degree of freedom with which the mounting position of the front derailleur 45 can be adjusted with respect to the fastening piece 81.

Although the embodiment just described provides only one auxiliary intermediate piece, it is also acceptable to provide two or more auxiliary intermediate pieces having different X dimensions in order to enable finer adjustment or adjustment over a wider range in the longitudinal direction (X direction).

Third Embodiment

Figure 13:
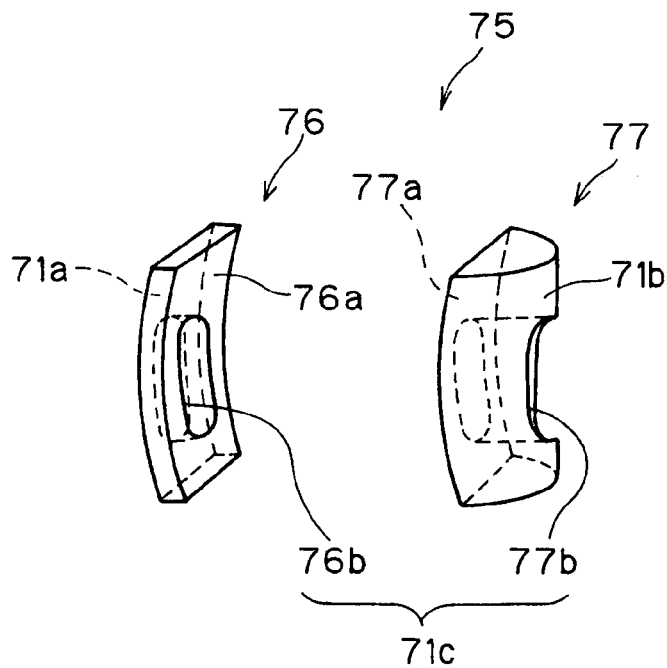
FIG. 13 is an exploded perspective view of an intermediate piece in accordance with a third embodiment of the front derailleur.

Referring now to FIG. 13, an intermediate part 75 in accordance with a third embodiment is illustrated that is used in conjunction with the intermediate piece 71 of the first embodiment or the second auxiliary intermediate piece 74 of the second embodiment. The intermediate part 75 will now be explained as being incorporated into the front derailleur 45 that was described in the previous embodiments. In view of the similarity between this embodiment and the prior embodiments, the parts of this embodiment that are identical to the parts of the prior embodiments will be given the same reference numerals as the parts of the prior embodiments. Moreover, the descriptions of the parts of this embodiment that are identical to the parts of the prior embodiments may be omitted for the sake of brevity.

The front derailleur 45 of second embodiment is provided with two intermediate pieces 71 and 74 having different X dimensions (i.e., lengths in the X direction) in order to allow adjusting the position of the mounting part 66 with respect to the fastening piece 81 in the longitudinal direction. It is also acceptable to use an intermediate part 75 that can be divided into a first section 76 and a second section 77 as shown in FIG. 13.

The second section 77 has a second curved abutting face 71b, an eighth curved abutting face 77a, and a sixth through hole 77b. The second curved abutting face 71b is curved in a manner corresponding to the contour of the first curved support face 83a in a cross sectional view of the second section 77 lying in a plane normal to the Z direction. The eighth curved abutting face 77a is curved in a manner corresponding to the contour of the curved mounting face 66a in a cross sectional view of the second section 77 lying in a plane normal to the Y direction. The sixth through hole 77b runs in a direction substantially parallel to the X direction and passes through the second curved abutting face 71b and the eight abutting face 77a. The eighth curved abutting face 77a is exposed when the second section 77 is separated from the first section 76.

The first section 76 has a first curved abutting face 71a, a seventh curved abutting face 76a, and a fifth through hole 76b. The first curved abutting face 71a is curved in a manner corresponding to the contour of the curved mounting face 66a in a cross sectional view of the first section 76 lying in a plane normal to the Y direction. The seventh curved abutting face 76a is curved in such a manner that it can be mated with the eight abutting section 77a. The fifth through hole 76b runs in a direction substantially parallel to the X direction and passes through the first abutting surface 71a and the seventh abutting surface 76a.

When the first section 76 and the second section 77 are mated together, the fifth through hole 76b and the sixth through hole 77b link together to form the second through hole 71c. In other words, when the first section 76 and the second section 77 are mated together, the intermediate piece 75 of this embodiment has a length L1 in the Y [sic] direction and functions in the same manner as the intermediate piece 71 (see FIGS. 5 to 7). When the second section 77 is used alone, i.e., without the first section 76, it has a length L2 in the X direction and functions in the same manner as the auxiliary intermediate piece 74 (see FIGS. 11 and 12).

As a result, in cases where the fixing part 82 of the fastening piece 81 has been mounted imprecisely to the seat tube 28 in such a manner as to be offset from where it should be in the longitudinal direction of the bicycle, the mounting position of the front derailleur 45 can be adjusted by moving it in the X direction (i.e., longitudinally) such that the prescribed mounting position with respect to the sprockets 55 and 56 and chain 44 (shown in FIG. 1) is obtained.

In short, this embodiment of the front derailleur 45 enables the mounting position of the front derailleur 45 with respect to the fastening piece 81 to be adjusted in a fourth direction, i.e., the longitudinal direction (longitudinal movement), in addition to the three directions already described (i.e., upward and downward movement, transverse swinging, and vertical swinging). Thus, this embodiment further increases the degree of freedom with which the mounting position of the front derailleur 45 can be adjusted with respect to the fastening piece 81.

Although the embodiment just described uses an intermediate piece that can be divided into two sections, it is also acceptable to design an intermediate piece having three or more sections in order to enable finer adjustment or adjustment over a wider range in the longitudinal direction (X direction).

Fourth Embodiment

Figure 14:
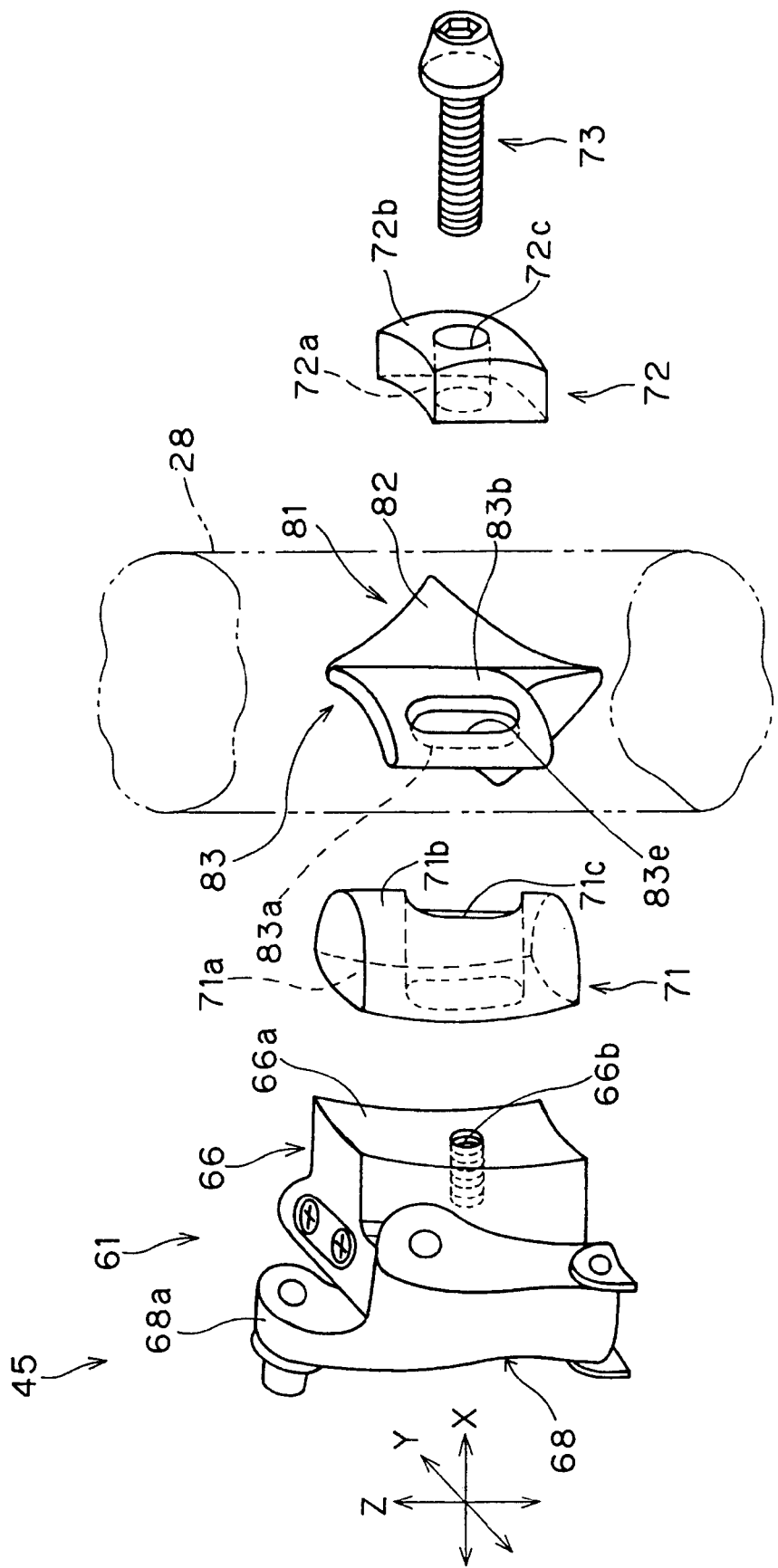
FIG. 14 is an exploded perspective view showing the structure used to mount the mounting part of the front derailleur to the fastening piece in the case of a front derailleur in accordance with a fourth embodiment.
Figure 15:
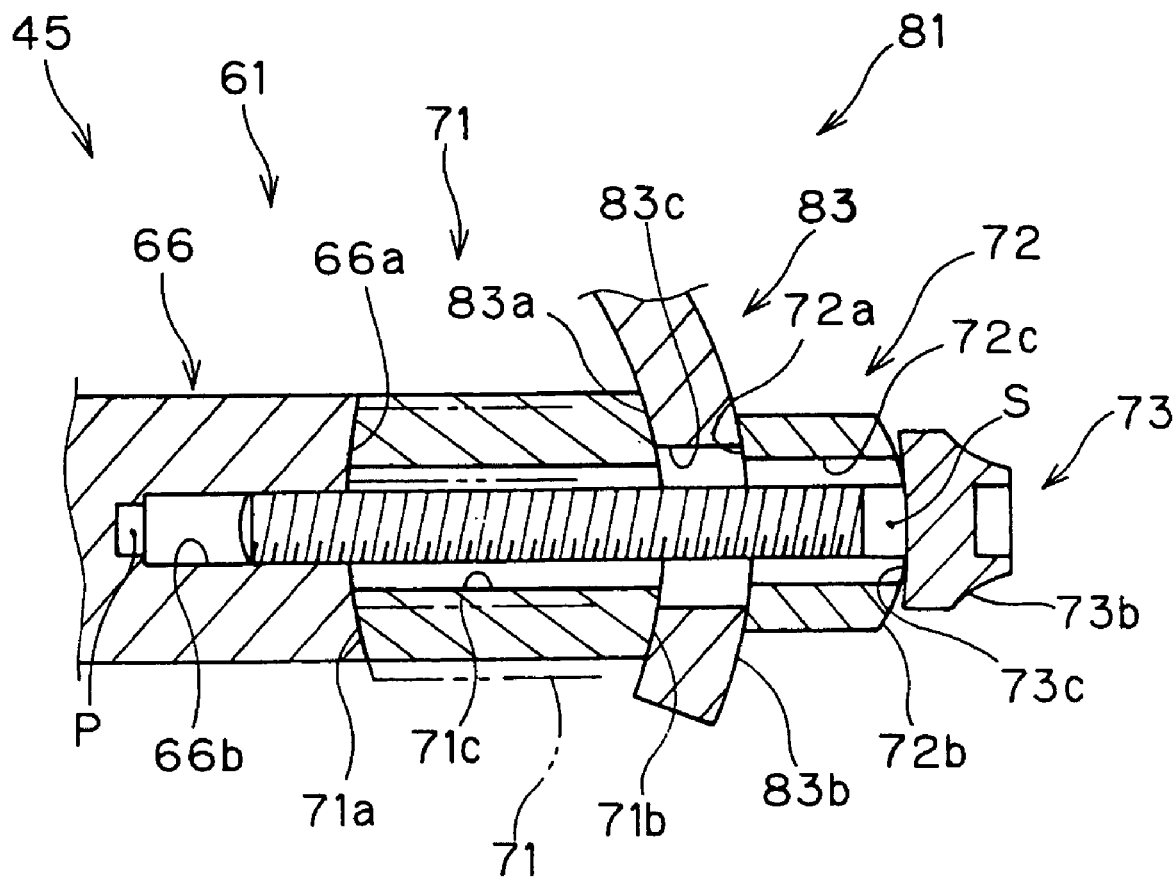
FIG. 15 is a simplified top plan cross sectional view showing the mounting part of the front derailleur mounted to the fastening piece in the case of a front derailleur in accordance with the fourth embodiment.

Referring now to FIGS. 14 and 15, a front derailleur 45 in accordance with a fourth embodiment will now be explained. In view of the similarity between this embodiment and the prior embodiments, the parts of this embodiment that are identical to the parts of the prior embodiments will be given the same reference numerals as the parts of the prior embodiments. Moreover, the descriptions of the parts of this embodiment that are identical to the parts of the prior embodiments may be omitted for the sake of brevity.

Although in the previously described embodiment of the front derailleur 45 the curved mounting face 66a of the mounting part 66 and the first curved abutting face 71a of the intermediate piece 71 are curved to form a circular arc in a cross sectional view that lies in a plane normal to the Y direction, it is also acceptable for these faces to be curved in a spherical manner as shown in FIG. 14.

When the faces are spherical, in addition to the vertical swing movement shown in FIG. 10, the mounting part 66 can be swung transversely about the center of curvature S of the curved mounting face 66a (see FIG. 15) or in an intermediate direction between the vertical swing direction and the transverse swing direction (i.e., in a diagonal swing direction). Thus, the front derailleur 45 can be swung both vertically and transversely at the mating surfaces between the curved mounting face 66a of the mounting part 66 and the first curved abutting face 71a of the intermediate piece 71 alone.

Although this embodiment presents a case in which the first curved abutting face 71a of the intermediate piece 71 is provided with a spherical curvature, it is also acceptable to apply such a spherical curvature to the fifth curved abutting face 74a of the auxiliary intermediate piece 74 in second embodiment or the eight abutting face 77a of the second section 77 in the third embodiment.

Fifth Embodiment

Figure 16:
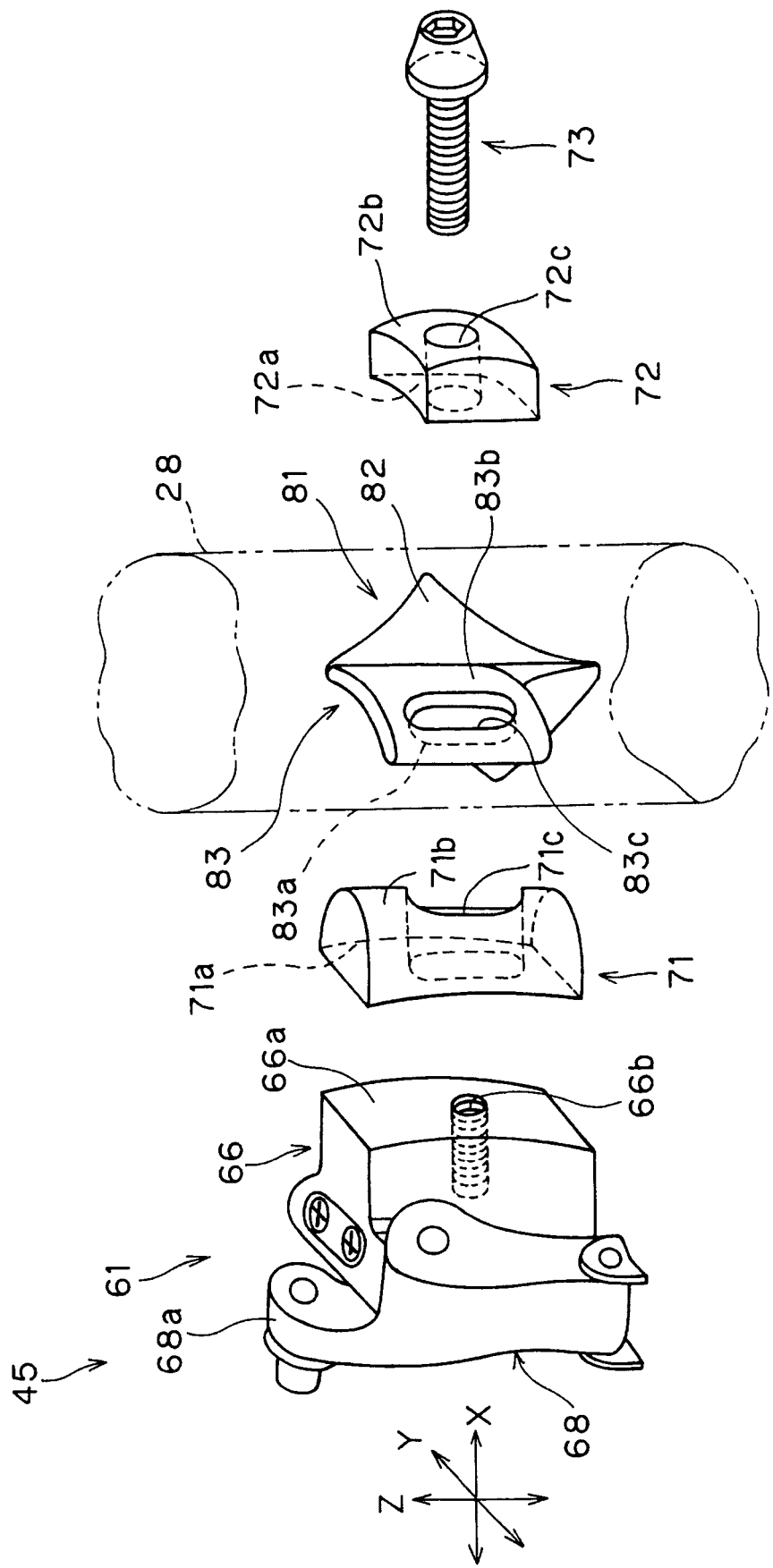
FIG. 16 is an exploded perspective view showing the structure used to mount the mounting part of the front derailleur to the fastening piece in the case of a front derailleur in accordance with a fifth embodiment.
Figure 17:
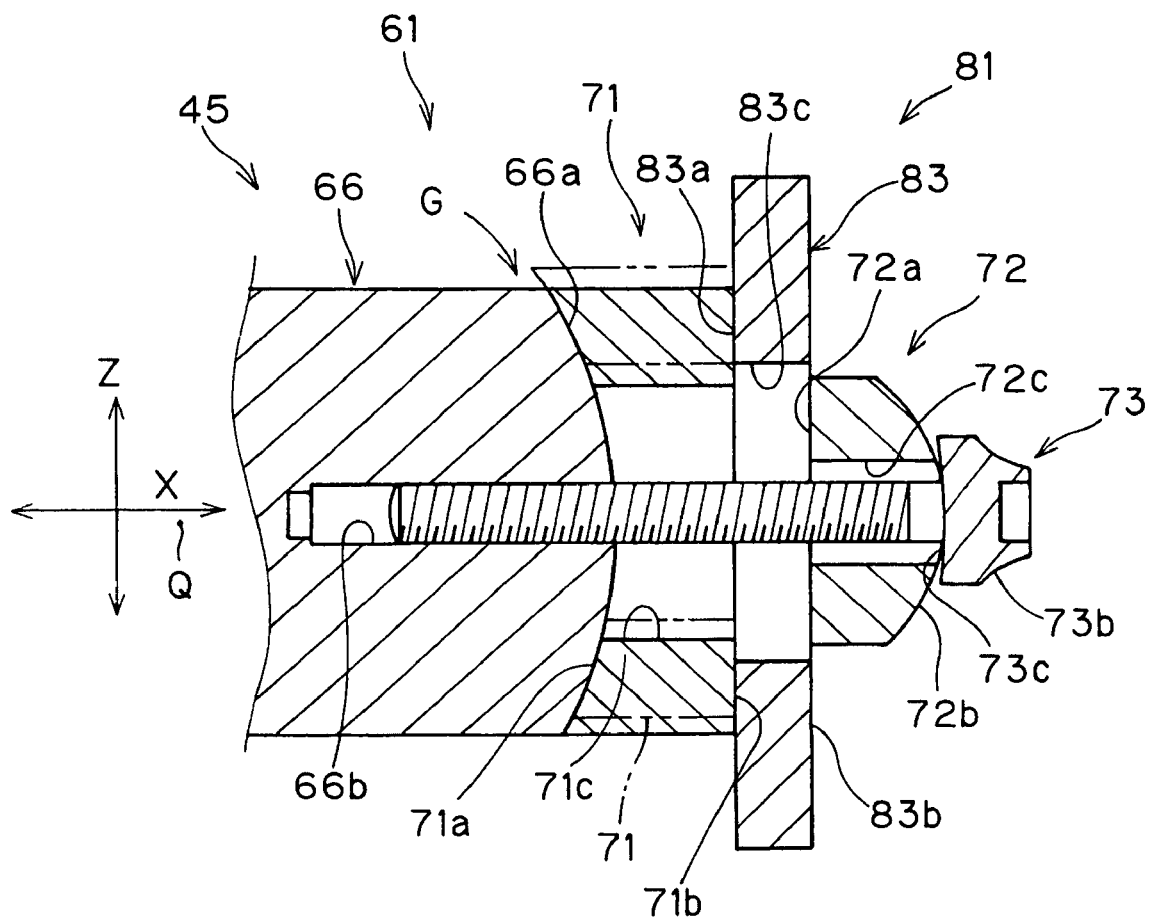
FIG. 17 is a simplified side cross sectional view showing the mounting part of the front derailleur mounted to the fastening piece in the case of a front derailleur in accordance with the fifth embodiment.

Referring now to FIGS. 16 and 17, a front derailleur 45 in accordance with a fifth embodiment will now be explained. In view of the similarity between this embodiment and the prior embodiments, the parts of this embodiment that are identical to the parts of the prior embodiments will be given the same reference numerals as the parts of the prior embodiments. Moreover, the descriptions of the parts of this embodiment that are identical to the parts of the prior embodiments may be omitted for the sake of brevity.

Although in the previously described embodiment of the front derailleur 45 the curved mounting face 66a of the mounting part 66 and the first curved abutting face 71a of the intermediate piece 71 are curved to form a circular arc that bulges away from the support part 83 in a cross sectional view lying in a plane normal to the Y direction, it is also acceptable for these faces to be curved in such a manner as to bulge toward the support part 83 as shown in FIG. 16.

With this configuration, as shown in FIG. 17, the center of curvature Q of the curved mounting face 66a is shifted toward the front derailleur 45 but the front derailleur 45 can still be swung about the point Q (more specifically, swung in the direction of the arrow G with respect to the fastening piece 81) similarly to FIG. 10.

Although this embodiment describes a case in which the first curved abutting face 71a of the intermediate piece 71 is curved so as to bulge (in a concave manner) toward the support part 83 in a cross sectional view lying in a plane normal to the Y direction, it is also acceptable to apply such a curvature to the fifth curved abutting face 74a of the auxiliary intermediate piece 74 in the second embodiment or the eight abutting face 77a of the second section 77 in the third embodiment. It is also acceptable to make the spherical curvatures of the curved mounting face 66a and the first curved abutting face 71a in the fourth embodiment bulge toward the support part 83.

Sixth Embodiment

Figure 18:
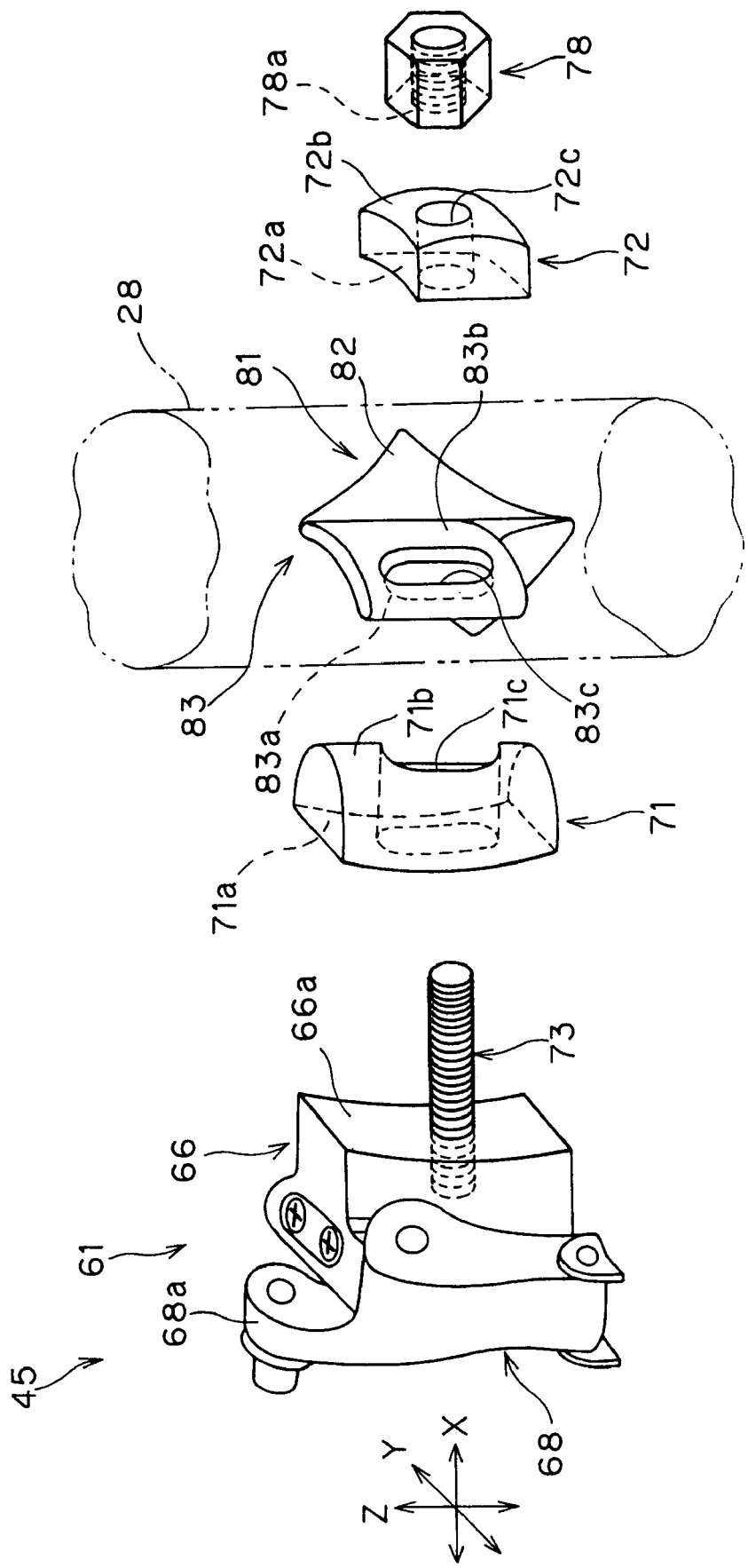
FIG. 18 is an exploded perspective view showing the structure used to mount the mounting part of the front derailleur to the fastening piece in the case of a front derailleur in accordance with a sixth embodiment.
Figure 19:
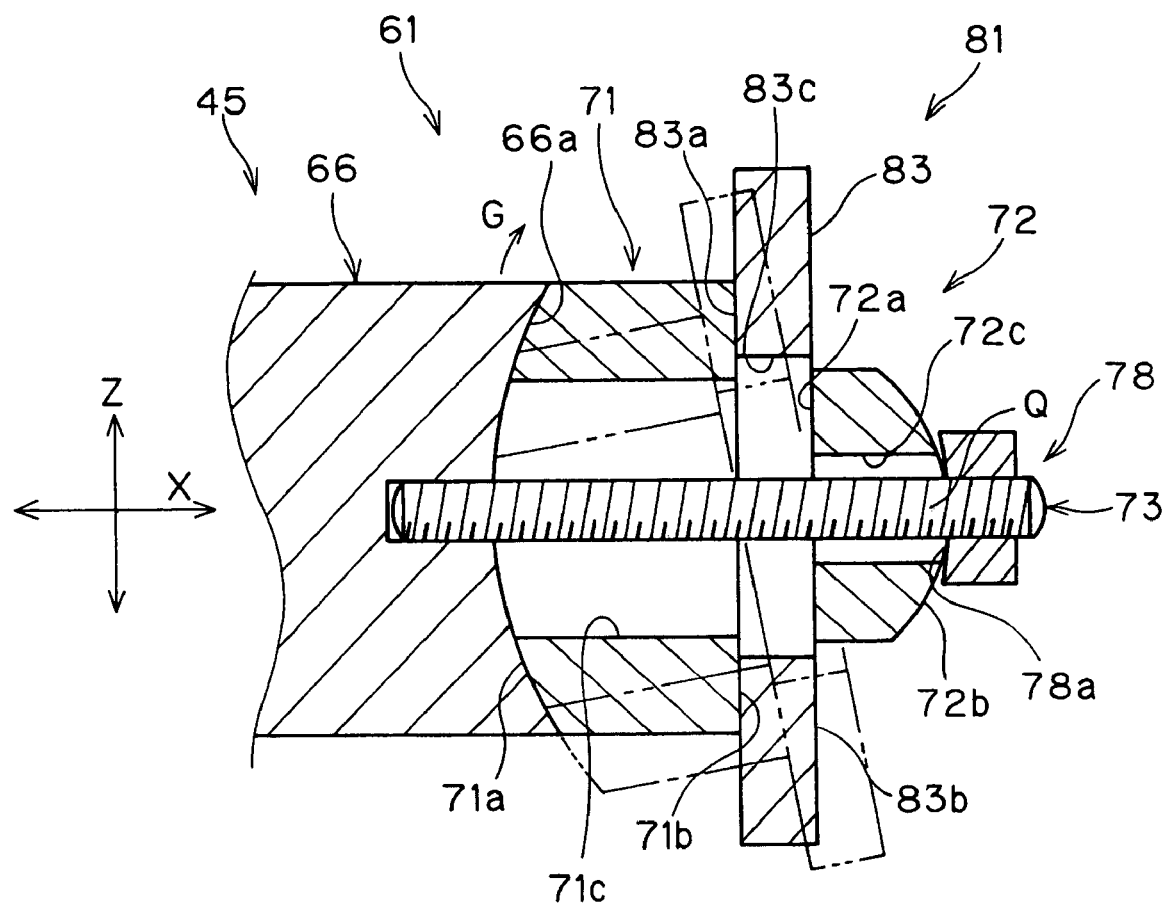
FIG. 19 is a simplified side cross sectional view showing the mounting part of the front derailleur mounted to the fastening piece in the case of a front derailleur in accordance with the sixth embodiment.
Figure 20:
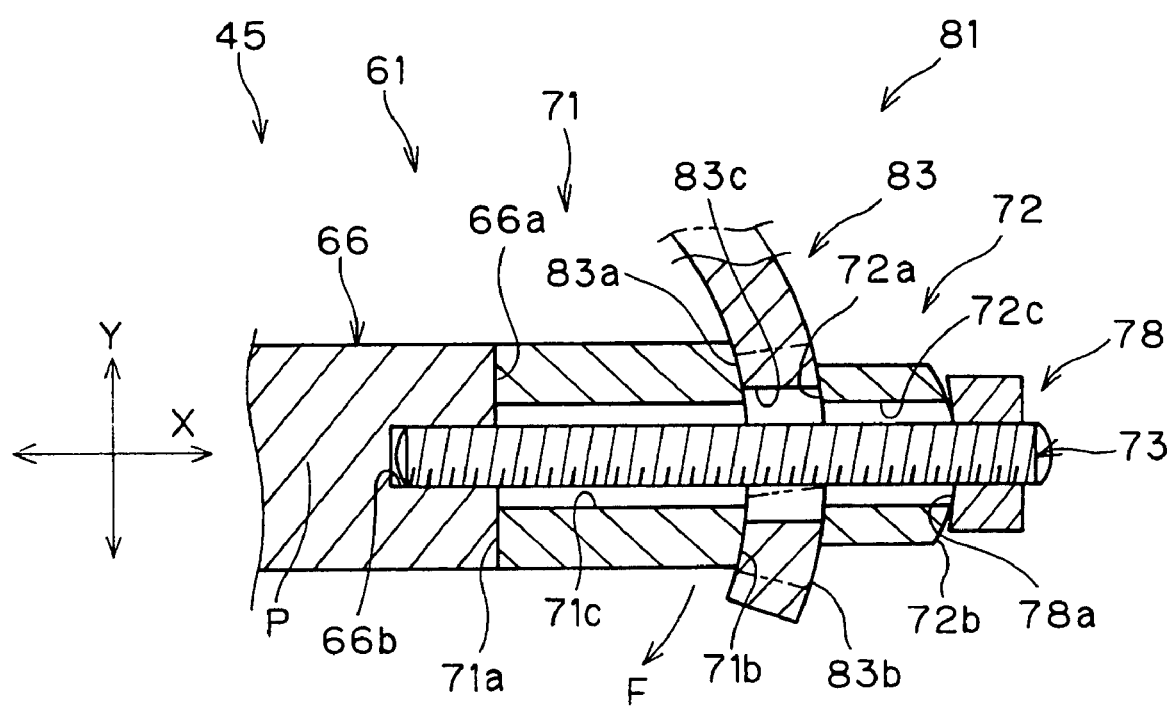
FIG. 20 is a simplified top plan cross sectional view showing the mounting part of the front derailleur mounted to the fastening piece in the case of a front derailleur in accordance with the sixth embodiment.

Referring now to FIGS. 18-20, a front derailleur 45 in accordance with a sixth embodiment will now be explained. In view of the similarity between this embodiment and the prior embodiments, the parts of this embodiment that are identical to the parts of the prior embodiments will be given the same reference numerals as the parts of the prior embodiments. Moreover, the descriptions of the parts of this embodiment that are identical to the parts of the prior embodiments may be omitted for the sake of brevity.

Although in the previously described embodiment of the front derailleur 45 the fastening screw 73 passes through the support part 83 of the fastening piece 81 and screws into the screw threaded hole 66b of the mounting part 66, it is also acceptable to make the fastening screw 73 a threaded part or a threaded stud (a threaded stud is used in this embodiment) that protrudes in the X direction from the curved mounting face 66a of the mounting part 66, passes through the intermediate piece 71 and the support part 83, and is fastened at the tip end thereof with nut 78 (a hexagonal nut is used in this embodiment) disposed on the second curved support face 83b side of the support part 83. Such an arrangement is illustrated in FIGS. 18 to 20.

Here again, as shown in FIG. 19, the front derailleur 45 can be swung about the point Q (more specifically, swung in the direction of the arrow G with respect to the fastening piece 81) similarly to the case shown in FIG. 10. Also, as shown in FIG. 20, the front derailleur 45 can be swung about the point P (more specifically, swung in the direction of the arrow F with respect to the fastening piece 81) similarly to the case shown in FIG. 9. Additionally, the face 78a of the nut 78 that touches against the fourth curved abutting face 72b of the washer 72 is curved in a manner corresponding to the contour of the fourth curved abutting face 72b. Thus, similarly to the face 73c of the head 73b of the fastening screw 73 in the previously described embodiment, good surface contact can be maintained between the fourth abutting surface 72b and the face 78a when the nut 78 is tightened.

It is also acceptable to use a bolt and nut like those used in this embodiment in the front derailleurs of the second through fourth embodiments.

Other Embodiments

Although the preceding embodiment and embodiments thereof illustrate cases in which the present invention is applied to a front derailleur for a road bike, the present invention can also be applied to other types of bicycle. The structure of the front derailleur is not limited to the structure disclosed in the embodiment and the embodiments thereof. The present invention can be applied to any front derailleur configured to be mounted to the frame of a bicycle by fastening the mounting part of the front derailleur main body to a fastening piece that has already been attached to the frame.

Although in the previously described embodiment and embodiments thereof the fastening piece is fixed to the seat tube of the bicycle frame and the support part of the fastening piece is aligned with the center axis of the seat tube, the present invention is not limited to such an arrangement. Rather, the present invention can be applied to cases in which the fastening piece is attached in a different location or oriented such that the support part thereof is aligned with a direction other than the center axis of the seat tube. In such cases, the directions X, Y, and Z will indicate directions other than the longitudinal direction of the bicycle, transverse direction of the bicycle, and center axis of the seat tube, respectively, that they indicated in the previous embodiments and embodiments thereof. Thus, in such cases, the details of adjusting the mounting position of the front derailleur will differ from the previously described embodiment and embodiments thereof.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle front derailleur comprising:
a chain guide configured to engage a bicycle chain;
a front derailleur main body operatively coupled to the chain guide, the front derailleur main body including a mounting part with a cylindrically curved mounting face being defined by an X-Y-Z coordinate system of the front derailleur main body such that the cylindrically curved mounting face has a circular arc in a cross section lying in an X-Z plane of the X-Y-Z coordinate system that is perpendicular to a first direction corresponding to a Y-direction of the X-Y-Z coordinate system; and
a first intermediate piece including a first cylindrically curved abutting face mating with the cylindrically curved mounting face of the mounting part to pivot relative to each other, a second cylindrically curved abutting face having a circular arc in a cross section lying in an X-Y plane of the X-Y-Z coordinate system that is perpendicular to a second direction corresponding to a Z-direction of the X-Y-Z coordinate system, and a first through hole extending in a third direction corresponding to a X-direction of the X-Y-Z coordinate system that is generally perpendicular to the first and second directions and passes through the first and second cylindrically curved abutting faces,
the first cylindrically curved abutting face of the first intermediate piece having a curvature that restricts pivotal movement of the first intermediate piece relative to the front derailleur main body to pivotal movement within the X-Z plane, and
the second cylindrically curved abutting face of the first intermediate piece having a curvature that restricts pivotal movement of the first intermediate piece relative to a mating cylindrically curved support face of a support part of a bicycle frame to pivotal movement within the X-Y plane when the front derailleur is mounted to the support part of the bicycle frame.

2. A bicycle front derailleur comprising:
a chain guide configured to engage a bicycle chain;
a front derailleur main body operatively coupled to the chain guide, the front derailleur main body including a mounting part with a cylindrically curved mounting face being defined by an X-Y-Z coordinate system of the front derailleur main body such that the cylindrically curved mounting face has a circular arc in a cross section lying in an X-Z plane of the X-Y-Z coordinate system that is perpendicular to a first direction corresponding to a Y-direction of the X-Y-Z coordinate system; and
a first intermediate piece including a first cylindrically curved abutting face mating with the cylindrically curved mounting face of the mounting part to pivot relative to each other, a second cylindrically curved abutting face having a circular arc in a cross section lying in an X-Y plane of the X-Y-Z coordinate system that is perpendicular to a second direction corresponding to a Z-direction of the X-Y-Z coordinate system, and a first through hole extending in a third direction corresponding to a X-direction of the X-Y-Z coordinate system that is generally perpendicular to the first and second directions and passes through the first and second cylindrically curved abutting faces
a support part configured to be mounted to a bicycle frame, the support part including
a first cylindrically curved support face having a circular arc mating with the second cylindrically curved abutting face of the first intermediate piece to pivot relative to each other, and
a second through hole that is elongated in a direction substantially parallel to the second direction and extending through the first cylindrically curved support face in the third direction; and a fastening screw extending through the first and second through holes to fasten the mounting part to the support part with the first intermediate piece disposed therebetween.

3. The bicycle front derailleur as recited in claim 2, wherein the first through hole is elongated in a direction substantially parallel to the second direction.

4. The bicycle front derailleur as recited in claim 2, further comprising a second intermediate piece configured to be selectively used in place of the first intermediate piece between the mounting face of the mounting part and the first curved support face of the support part, the second intermediate piece including curved abutting faces that mate with the curved mounting face of the mounting part and the first curved support face of the support part, respectively, with a through hole extending in the second direction therebetween, the second intermediate piece having a different thickness in the second direction than the first intermediate piece.

5. The bicycle front derailleur as recited in claim 4, further comprising a washer disposed between a head portion of the fastening screw and a second curved support face of the support part that faces in an opposite direction from the first curved support face of the support part, the washer having a third curved abutting face facing the second curved support face, a fourth curved abutting face facing the head portion of the fastening screw, and a third through hole passing through the third and fourth curved abutting faces of the washer, the mounting part having a threaded hole extending through the curved mounting face to receive a threaded shaft portion of the fastening screw, and the fastening screw passing through the first to third through holes and screwed into the threaded hole of the mounting part.

6. The bicycle front derailleur as recited in claim 2, wherein the first intermediate piece includes a first section having the first abutting face and a second section having the second abutting face with the first and second sections having intermediate mating curved abutting faces with the intermediate mating curved abutting face of the second section being curved to mate with the mounting face of the mounting part in a cross sectional view of the second section lying in a plane normal to the third direction when the second section is separated from the first section.

7. The bicycle front derailleur as recited in claim 6, further comprising a washer disposed between a head portion of the fastening screw and a second curved support face of the support part that faces in an opposite direction from the first curved support face of the support part, the washer having a third curved abutting face facing the second curved support face, a fourth curved abutting face facing the head portion of the fastening screw, and a third through hole passing through the third and fourth curved abutting faces of the washer, the mounting part having a threaded hole extending through the curved mounting face to receive a threaded shaft portion of the fastening screw, and the fastening screw passing through the first to third through holes and screwed into the threaded hole of the mounting part.

8. A bicycle front derailleur comprising:

a chain guide configured to engage a bicycle chain;

a front derailleur main body operatively coupled to the chain guide, the front derailleur main body including a mounting part with a curved mounting face being defined by an X-Y-Z coordinate system of the front derailleur main body such that the curved mounting face has a circular arc in a cross section lying in an X-Z plane of the X-Y-Z coordinate system that is perpendicular to a first direction corresponding to a Y-direction of the X-Y-Z coordinate system, the mounting part further having a threaded hole extending through the curved mounting face;

a first intermediate piece including a first curved abutting face mating with the curved mounting face of the mounting part to pivot relative to each other, a second curved abutting face having a circular arc in a cross section lying in an X-Y plane of the X-Y-Z coordinate system that is perpendicular to a second direction corresponding to a Z-direction of the X-Y-Z coordinate system, and a first through hole extending in a third direction corresponding to a X-direction of the X-Y-Z coordinate system that is generally perpendicular to the first and second directions and passes through the first and second abutting faces;

a support part configured to be mounted to a bicycle frame, the support part including a first curved support face having a circular arc mating with the second curved abutting face of the first intermediate piece to pivot relative to each other, and a second through hole that is elongated in a direction substantially parallel to the second direction and extending through the first curved support face in the third direction;

a washer disposed between a head portion of the fastening screw and a second curved support face of the support part that faces in an opposite direction from the first curved support face of the support part, the washer having a third curved abutting face facing the second curved support face, a fourth curved abutting face facing the head portion of the fastening screw, and a third through hole passing through the third and fourth curved abutting faces of the washer; and a fastening screw passing through the first to third through holes and screwed into the threaded hole of the mounting part to fasten the mounting part to the support part with the first intermediate piece disposed therebetween.

9. The bicycle front derailleur as recited in claim 8, wherein the second curved support face is curved about a cross section lying in the X-Y plane of the X-Y-Z coordinate system; and the third curved abutting face is curved to mate with the second curved support face to pivot relative to each other.

10. The bicycle front derailleur as recited in claim 9, wherein the fourth curved abutting face is a partial spherical surface; and the head portion of the fastening screw has a curved surface that mates with the fourth curved abutting face that corresponds to a contour of the fourth curved abutting face.

11. The bicycle front derailleur as recited in claim 8, wherein the fourth curved abutting face is a partial spherical surface; and the head portion of the fastening screw has a curved surface that mates with the fourth curved abutting face that corresponds to a contour of the fourth curved abutting face.

* * * * *